United States Patent
Kobel et al.

(10) Patent No.: US 11,820,636 B2
(45) Date of Patent: *Nov. 21, 2023

(54) IMPLEMENT POSITION TRACKING FOR A LIFT DEVICE

(71) Applicant: Oshkosh Corporation, Oshkosh, WI (US)

(72) Inventors: Korry D. Kobel, Oshkosh, WI (US); Stefan Eshleman, Oshkosh, WI (US); Robert S. Messina, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,216

(22) Filed: Jan. 4, 2023

(65) Prior Publication Data

US 2023/0142225 A1     May 11, 2023

Related U.S. Application Data

(63) Continuation of application No. 17/720,922, filed on Apr. 14, 2022, now Pat. No. 11,572,262.

(Continued)

(51) Int. Cl.
    *B66F 9/075*      (2006.01)
    *B66F 11/04*      (2006.01)

(52) U.S. Cl.
    CPC ........ *B66F 9/07581* (2013.01); *B66F 11/044* (2013.01)

(58) Field of Classification Search
    CPC ...... B66F 9/061; B66F 9/0655; B66F 9/0755; B66F 17/006; B66F 11/00; B66F 11/042;

(Continued)

(56) References Cited

U.S. PATENT DOCUMENTS

2013/0103271 A1 *  4/2013  Best ..................... B66C 13/40
                                                                            701/50
2014/0278078 A1    9/2014 Cameron et al.

(Continued)

FOREIGN PATENT DOCUMENTS

| EP | 3 477 329 A1 | 5/2019 |
|---|---|---|
| EP | 3 477 335 A1 | 5/2019 |
| WO | WO-2017/196584 A1 | 11/2017 |

OTHER PUBLICATIONS

International Search Report and Written Opinion regarding Application No. PCT/US2022/024872, dated Jul. 21, 2022, 12 pps.

(Continued)

*Primary Examiner* — Tyrone V Hall, Jr.
(74) *Attorney, Agent, or Firm* — Foley & Lardner LLP

(57) ABSTRACT

A machine system includes a first wireless transceiver, a plurality of second wireless transceivers, and a processing circuit. The first wireless transceiver is configured to couple to a portion or a component of a lift assembly of a machine. The first wireless transceiver is configured to transmit a first wireless signal. The plurality of second wireless transceivers are configured to couple to a base of the machine. The plurality of second wireless transceivers are configured to detect the first wireless signal and transmit a plurality of second wireless signals in response to detecting the first wireless signal. The first wireless transceiver is configured to detect the plurality of second wireless signals. The processing circuit is communicably coupled to the first wireless transceiver. The processing circuit is configured to determine a position of the portion or the component of the lift assembly based on information acquired from the first wireless transceiver.

20 Claims, 11 Drawing Sheets

Related U.S. Application Data

(60) Provisional application No. 63/176,574, filed on Apr. 19, 2021.

(58) Field of Classification Search
CPC ..... B66F 11/044; B66F 11/046; B66F 11/048; B66C 13/40; B66C 13/44; B66C 13/46; G01S 19/42

See application file for complete search history.

(56) References Cited

U.S. PATENT DOCUMENTS

| | | |
|---|---|---|
| 2019/0121353 A1 | 4/2019 | Datema et al. |
| 2020/0095105 A1 | 3/2020 | Yutzy et al. |
| 2020/0317480 A1 | 10/2020 | Shankar et al. |
| 2021/0060366 A1 | 3/2021 | Minnick et al. |
| 2021/0276423 A1 | 9/2021 | Lombardo et al. |
| 2021/0279914 A1 | 9/2021 | Shoup et al. |
| 2022/0194769 A1 | 6/2022 | Kobel et al. |
| 2022/0198905 A1 | 6/2022 | Brulo et al. |

OTHER PUBLICATIONS

International Search Report and Written Opinion issued in connection with PCT Appl. No. PCT/US2023/018321 dated Aug. 9, 2023.

* cited by examiner

IMPLEMENT POSITION TRACKING FOR A LIFT DEVICE

CROSS-REFERENCE TO RELATED PATENT APPLICATION

This application is a continuation of U.S. patent application Ser. No. 17/720,922, filed Apr. 14, 2022, which claims the benefit of and priority to U.S. Provisional Patent Application No. 63/176,574, filed Apr. 19, 2021, both of which are incorporated herein by reference in their entireties.

BACKGROUND

The present disclosure relates generally to the field of lift devices. More specifically, the present disclosure relates to tracking a position of an implement supported by a lift device. Lift devices can be configured to support implements for performing various functions. For example, a lift device can include a platform that supports a user and/or a fork assembly for engaging and lifting materials. Such implements are often supported by a boom assembly that facilitates vertical and/or horizontal movement of the implements.

SUMMARY

One embodiment relates to a machine system. The machine system includes a first wireless transceiver, a plurality of second wireless transceivers, and a processing circuit. The first wireless transceiver is configured to couple to a portion or a component of a lift assembly of a machine. The first wireless transceiver is configured to transmit a first wireless signal. The plurality of second wireless transceivers are configured to couple to a base of the machine. The plurality of second wireless transceivers are configured to detect the first wireless signal and transmit a plurality of second wireless signals in response to detecting the first wireless signal. The first wireless transceiver is configured to detect the plurality of second wireless signals. The processing circuit is communicably coupled to the first wireless transceiver. The processing circuit is configured to determine a position of the portion or the component of the lift assembly based on a time delay determined based on an amount of time between (i) a first time when the first wireless signal is transmitted by the first wireless transceiver and a second time at which each of the plurality of second wireless signals is detected by the first wireless transceiver or (ii) a timestamp included with each of the plurality of second wireless signals and a receipt time that each of the plurality of second wireless signals is detected by the first wireless transceiver.

Another embodiment relates to a machine system. The machine system includes a first wireless transceiver, a plurality of second wireless transceivers, and a processing circuit. The first wireless transceiver is configured to couple to a portion or a component of a lift assembly of a machine. The first wireless transceiver configured to transmit a first wireless signal. The plurality of second wireless transceivers are configured to couple to a base of the machine. The plurality of second wireless transceivers are configured to detect the first wireless signal and transmit a plurality of second wireless signals in response to detecting the first wireless signal. The first wireless transceiver is configured to detect the plurality of second wireless signals. The processing circuit is communicably coupled to the first wireless transceiver. The processing circuit is configured to determine a position of the portion or the component of the lift assembly based on information acquired from the first wireless transceiver, store a log of the position over time, and generate a heat map identifying various positions of the portion or the component and varying degrees of time spent at each of the various positions based on the log.

Still another embodiment relates to a machine system. The machine system includes a first wireless transceiver, a plurality of second wireless transceivers, and a processing circuit. The first wireless transceiver is configured to couple to a portion or a component of a lift assembly of a machine. The first wireless transceiver is configured to transmit a first wireless signal. The plurality of second wireless transceivers are configured to couple to a base of the machine. The plurality of second wireless transceivers are configured to detect the first wireless signal and transmit a plurality of second wireless signals in response to detecting the first wireless signal. The first wireless transceiver is configured to detect the plurality of second wireless signals. The processing circuit is configured to determine a position of the portion or the component of the lift assembly based on information acquired from the first wireless transceiver, and identify unintentional movement of the portion or the component of the lift assembly while the lift assembly is at a set position.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, a lift device is configured to support an implement (e.g., a platform (e.g., for carrying an operator, tools, etc.), a fork assembly, a bucket (e.g., for carrying a person, for a construction machine, etc.), a basket, a plow, a grabber mechanism (e.g., for grabbing residential refuse containers, a claw for use in junk yards, etc.), a water deluge turret (e.g., for a fire apparatus, etc.), etc.) and includes a chassis and a lift assembly coupling the implement to the chassis. An operator may control the lift assembly to raise, lower, or otherwise move the implement or, in some cases, movement of the lift assembly and/or the lift device may be at least partially automated. In some embodiments, one or more transceivers may be coupled to the implement and/or to the lift assembly, and a plurality of additional transceivers may be coupled to various points on the chassis or body of the lift device. The transceivers coupled to the implement and/or to the lift assembly may be configured as "tags" for determining a position of the implement and/or to the lift assembly, while the additional transceivers coupled to various other points of the lift device may be configured as "anchors" with known positions. In this manner, the tag(s) may communicate short-range wireless signals with the anchors and, based on a time delay between broadcasting (i.e., transmitting) and receiving these short-range wireless signals, a position of the implement and/or to the lift assembly can be determined.

Lift Device

Figure 1A:
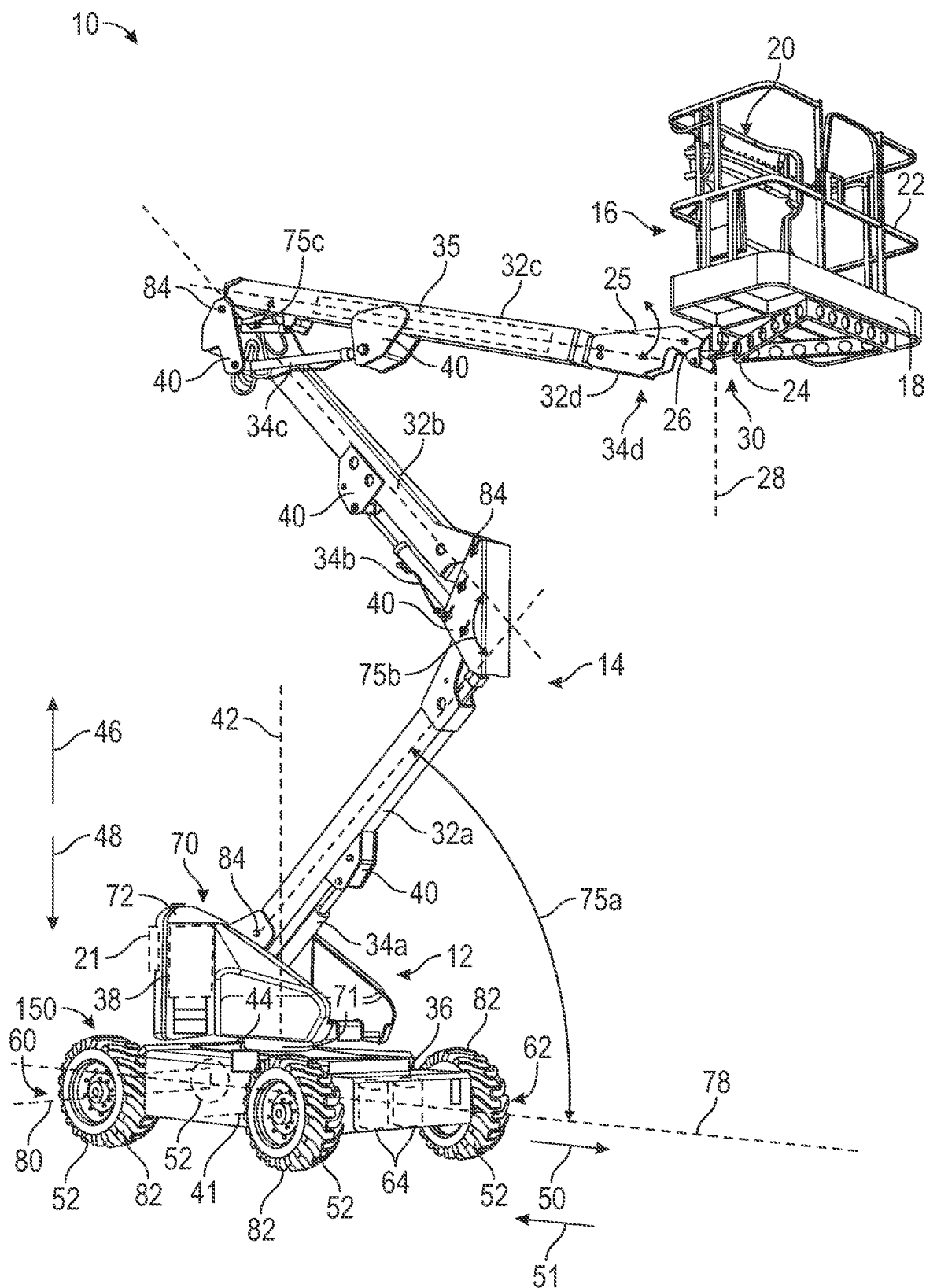
FIG. 1A is a front perspective view of a lift device, according to some embodiments.

Turning first to FIG. 1A, a machine, a lifting apparatus, lift device, or mobile elevating work platform (MEWP) (e.g., a telehandler, a boom lift, a towable boom lift, a lift device, an electric boom lift, etc.), shown as lift device 10, includes a base (e.g., a support assembly, a drivable support assembly, a support structure, a chassis, etc.), shown as base assembly 12, an implement (e.g., a platform, a terrace, a fork assembly, a bucket, a basket, a grabber arm/mechanism, a water deluge turret, a plow, etc.), shown as implement 16, and a lift system (e.g., a boom, a boom lift assembly, a lifting apparatus, an articulated arm, a scissors lift, lift arms, an aerial ladder, etc.), shown as lift assembly 14. Lift device 10 includes a front end (e.g., a forward facing end, a front portion, a front, etc.), shown as front 62, and a rear end (e.g., a rearward facing end, a back portion, a back, a rear, etc.,) shown as rear 60. Lift assembly 14 is configured to elevate implement 16 in an upwards direction 46 (e.g., an upward vertical direction) relative to base assembly 12. Lift assembly 14 is also configured to translate implement 16 in a downwards direction 48 (e.g., a downward vertical direction). Lift assembly 14 is also configured to translate implement 16 in either a forwards direction 50 (e.g., a forward longitudinal direction) or a rearwards direction 51 (e.g., a rearward longitudinal direction). Lift assembly 14 generally facilitates performing a lifting function to raise and lower implement 16, as well as movement of implement 16 in various directions.

Base assembly 12 defines a longitudinal axis 78 and a lateral axis 80. Longitudinal axis 78 defines forward direction 50 of lift device 10 and rearward direction 51. Lift device 10 is configured to translate in forward direction 50 and to translate backwards in rearward direction 51. Base assembly 12 includes one or more wheels, tires, wheel assemblies, tracks, rotary elements, treads, etc., shown as tractive elements 82. Tractive elements 82 are configured to rotate to drive (e.g., propel, translate, steer, move, etc.) lift device 10. Tractive elements 82 can each include an electric motor 52 (e.g., electric wheel motors) configured to drive tractive elements 82 (e.g., to rotate tractive elements 82 to facilitation motion of lift device 10). In other embodiments, tractive elements 82 are configured to receive power (e.g., rotational mechanical energy) from electric motors 52 or through a drive train (e.g., a combination of any number and configuration of a shaft, an axle, a gear reduction, a gear train, a transmission, etc.). In some embodiments, one or more tractive elements 82 are driven by a prime mover 41 (e.g., electric motor, internal combustion engine, etc.) through a transmission. In some embodiments, a hydraulic system (e.g., one or more pumps, hydraulic motors, conduits, valves, etc.) transfer power (e.g., mechanical energy) from one or more electric motors 52 and/or prime mover 41 to tractive elements 82. Tractive elements 82 and electric motors 52 (or prime mover 41) can facilitate a driving and/or steering function of lift device 10.

Figure 1B:
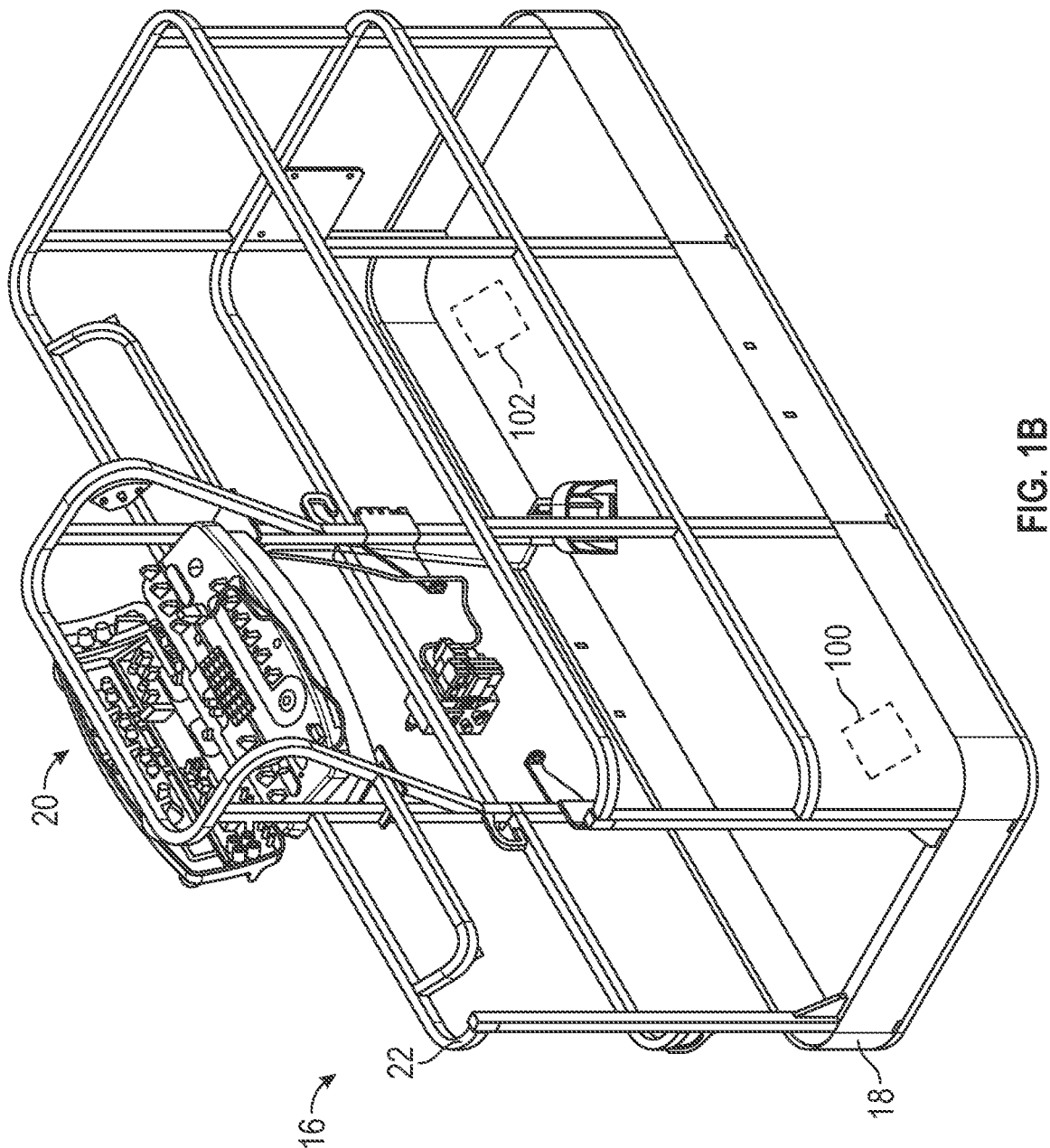
FIG. 1B is a front perspective view of a platform that can be coupled to the lift device of FIG. 1, according to some embodiments.

With additional reference to FIG. 1B, implement 16 is shown in further detail. As described herein, implement 16 may be any device or component configured to be coupled to an upper end of lift assembly 14. For example, implement 16 may be a platform for supporting an operator or may include a fork assembly for engaging and lifting materials (e.g., pallets). FIGS. 1A and 1B, in particular, show a configuration of implement 16 as an elevated work platform. In this example, implement 16 is configured to provide a work area for an operator of lift device 10 to stand/rest upon. Implement 16 can be pivotably coupled to an upper end of lift assembly 14. Lift device 10 is configured to facilitate the operator accessing various elevated areas (e.g., lights, platforms, the sides of buildings, building scaffolding, trees, power lines, etc.). Lift device 10 uses various electrically powered motors and electrically powered linear actuators or hydraulic cylinders to facilitate elevation and/or horizontal movement (e.g., lateral movement, longitudinal movement) of implement 16 (e.g., relative to base assembly 12, or to a ground surface that base assembly 12 rests upon).

As shown in FIGS. 1A and 1B, configured as a platform, implement 16 includes a base member, a base portion, a platform, a standing surface, a shelf, a work platform, a floor, a deck, etc., shown as deck 18. Deck 18 provides a space (e.g., a floor surface) for a worker to stand upon as implement 16 is raised and lowered. Implement 16 also includes a railing assembly including various members, beams, bars, guard rails, rails, railings, etc., shown as rails 22. Rails 22 extend along substantially an entire perimeter of deck 18. Rails 22 provide one or more members for the operator of lift device 10 to grasp while using lift device 10 (e.g., to grasp while operating lift device 10 to elevate implement 16). Rails 22 can include members that are substantially horizontal to deck 18. Rails 22 can also include vertical structural members that couple with the substantially horizontal members. The vertical structural members can extend upwards from deck 18.

As shown in FIGS. 1A and 1B, implement 16 can also include a human machine interface (HMI) (e.g., a user interface, an operator interface, etc.), shown as user interface 20. User interface 20 is configured to receive user inputs from the operator at or upon implement 16 to facilitate operation of lift device 10. User interface 20 can include any number of buttons, levers, switches, keys, etc., or any other user input device configured to receive a user input to operate lift device 10. User interface 20 may also provide information to the user (e.g., through one or more displays, lights, speakers, haptic feedback devices, etc.). User interface 20 can be supported by one or more of rails 22.

As shown in FIG. 1A, implement 16 includes a frame 24 (e.g., structural members, support beams, a body, a structure, etc.) that extends at least partially below deck 18. Frame 24 can be integrally formed with deck 18. Frame 24 is configured to provide structural support for deck 18 of implement 16. Frame 24 can include any number of structural members (e.g., beams, bars, I-beams, etc.) to support deck 18. Frame 24 couples implement 16 with lift assembly 14. Frame 24 may be rotatably or pivotably coupled with lift assembly 14 to facilitate rotation of implement 16 about an axis 28 (e.g., a vertical axis). Frame 24 can also rotatably/pivotably couple with lift assembly 14 such that frame 24 and implement 16 can pivot about an axis 25 (e.g., a horizontal axis).

In some embodiments, implement 16 can also include one or more transceiver devices 100. Transceiver devices 100 may be fixedly or removably coupled to any point on implement 16. For example, transceiver devices 100 may be coupled to frame 24, deck 18, rails 22, etc. In some embodiments, transceiver devices 100 may also be integrated with user interface 20. Additionally, in some embodiments, implement 16 can include one or more sensor arrays 102. Sensors arrays 102 may include a variety of different sensors for measuring height, movement, angle, etc., of implement 16. Like transceiver devices 100, sensor arrays 102 can also be coupled to frame 24, deck 18, rails 22, etc., and/or integrated with user interface 20. However, it will also be appreciated that transceiver devices 100 and/or sensor arrays 102 can be coupled to any other point on implement 16 or lift device 10. Both transceiver devices 100 and sensor arrays 102 are described in greater detail below.

Lift assembly 14 includes one or more beams, articulated arms, bars, booms, arms, support members, boom sections, cantilever beams, etc., shown as lift arms 32. Lift arms 32 are hingedly or rotatably coupled with each other at their ends. Lift arms 32 can be hingedly or rotatably coupled to facilitate articulation of lift assembly 14 and raising/lowering and/or horizontal movement of implement 16. Lift device 10 includes a lower lift arm 32a, a central or medial lift arm 32b, and an upper lift arm 32c. Lower lift arm 32a is configured to hingedly or rotatably couple at one end with base assembly 12 to facilitate lifting (e.g., elevation) of implement 16. Lower lift arm 32a is configured to hingedly or rotatably couple at an opposite end with the medial lift arm 32b.

Likewise, medial lift arm 32b is configured to hingedly or rotatably couple with upper lift arm 32c. Upper lift arm 32c can be configured to hingedly interface/couple and/or telescope with an intermediate lift arm 32d. Upper lift arm 32c can be referred to as "the jib" of lift device 10. Intermediate lift arm 32d may extend into an inner volume of upper lift arm 32c and extend and/or retract. Lower lift arm 32a and medial lift arm 32b may be referred to as "the boom" of the overall lift device 10 assembly. Intermediate lift arm 32d can be configured to couple (e.g., rotatably, hingedly, etc.), with implement 16 to facilitate leveling of implement 16. In other embodiments, lift assembly 14 includes a different number of lift arms (e.g., one, two, three, etc. lift arms.)

Lift arms 32 are driven to hinge or rotate relative to each other by actuators 34 (e.g., electric linear actuators, linear electric arm actuators, hydraulic cylinders, etc.). Actuators 34 can be mounted between adjacent lift arms 32 to drive adjacent lift arms 32 to hinge or pivot (e.g., rotate some angular amount) relative to each other about pivot points 84. Actuators 34 can be mounted between adjacent lift arms 32 using any of a foot bracket, a flange bracket, a clevis bracket, a trunnion bracket, etc. Actuators 34 are configured to extend or retract (e.g., increase in overall length, or decrease in overall length) to facilitate pivoting adjacent lift arms 32 to pivot/hinge relative to each other, thereby articulating lift arms 32 and raising or lowering implement 16.

Actuators 34 can be configured to extend (e.g., increase in length) to increase a value of an angle 74 formed between adjacent lift arms 32. Angle 74 can be defined between centerlines of adjacent lift arms 32 (e.g., centerlines that extend substantially through a center of lift arms 32). For example, actuator 34a is configured to extend/retract to increase/decrease angle 74a defined between a centerline of lower lift arm 32a and longitudinal axis 78 (angle 74a can also be defined between the centerline of lower lift arm 32a and a plane defined by longitudinal axis 78 and lateral axis 80) and facilitate lifting of implement 16 (e.g., moving implement 16 at least partially along upward direction 46). Likewise, actuator 34b can be configured to retract to decrease angle 74a to facilitate lowering of implement 16 (e.g., moving implement 16 at least partially along downward direction 48). Similarly, actuator 34b is configured to extend to increase angle 74b defined between centerlines of lower lift arm 32a and medial lift arm 32b and facilitate elevating of implement 16. Similarly, actuator 34b is configured to retract to decrease angle 74b to facilitate lowering of implement 16. Electric actuator 34c is similarly configured to extend/retract to increase/decrease angle 74c, respectively, to raise/lower implement 16.

Actuators 34 can be mounted (e.g., rotatably coupled, pivotably coupled, etc.) to adjacent lift arms 32 at mounts 40 (e.g., mounting members, mounting portions, attachment members, attachment portions, etc.). Mounts 40 can be positioned at any position along a length of each lift arm 32. For example, mounts 40 can be positioned at a midpoint of each lift arm 32, and a lower end of each lift arm 32.

Intermediate lift arm 32d and frame 24 are configured to pivotably interface/couple at a implement rotator 30 (e.g., a rotary actuator, a rotational electric actuator, a gear box, etc.). Implement rotator 30 facilitates rotation of implement 16 about axis 28 relative to intermediate lift arm 32d. In some embodiments, implement rotator 30 is positioned between frame 24 and upper lift arm 32c and facilitates pivoting of implement 16 relative to upper lift arm 32c. Axis 28 extends through a central pivot point of implement rotator 30. Intermediate lift arm 32d can also be configured to articulate or bend such that a distal portion of intermediate lift arm 32d pivots/rotates about axis 25. Intermediate lift arm 32d can be driven to rotate/pivot about axis 25 by extension and retraction of actuator 34d.

Intermediate lift arm 32d is also configured to extend/retract (e.g., telescope) along upper lift arm 32c. In some embodiments, lift assembly 14 includes a linear actuator (e.g., a hydraulic cylinder, an electric linear actuator, etc.), shown as extension actuator 35, that controls extension and retraction of intermediate lift arm 32d relative to upper lift arm 32c. In other embodiments, one more of the other arms of lift assembly 14 include multiple telescoping sections that are configured to extend/retract relative to one another.

Implement 16 is configured to be driven to pivot about axis 28 (e.g., rotate about axis 28 in either a clockwise or a counter-clockwise direction) by an electric or hydraulic motor 26 (e.g., a rotary electric actuator, a stepper motor, a platform rotator, a platform electric motor, an electric platform rotator motor, etc.). Motor 26 can be configured to drive frame 24 to pivot about axis 28 relative to upper lift arm 32c (or relative to intermediate lift arm 32d). Motor 26 can be configured to drive a gear train to pivot implement 16 about axis 28.

Lift assembly 14 is configured to pivotably or rotatably couple with base assembly 12. Base assembly 12 includes a rotatable base member, a rotatable platform member, a fully electric turntable, etc., shown as a turntable 70. Lift assembly 14 is configured to rotatably/pivotably couple with base assembly 12. Turntable 70 is rotatably coupled with a base, frame, structural support member, carriage, etc., of base assembly 12, shown as base 36. Turntable 70 is configured to rotate or pivot relative to base 36. Turntable 70 can pivot/rotate about central axis 42 relative to base 36, about a slew bearing 71 (e.g., slew bearing 71 pivotably couples turntable 70 to base 36). Turntable 70 facilitates accessing various elevated and angularly offset locations at implement 16. Turntable 70 is configured to be driven to rotate or pivot relative to base 36 and about slew bearing 71 by an electric motor, an electric turntable motor, an electric rotary actuator, a hydraulic motor, etc., shown as turntable motor 44. Turntable motor 44 can be configured to drive a geared outer surface 73 of slew bearing 71 that is rotatably coupled to base 36 about slew bearing 71 to rotate turntable 70 relative to base 36. Lower lift arm 32a is pivotably coupled with turntable 70 (or with a turntable member 72 of turntable 70) such that lift assembly 14 and implement 16 rotate as turntable 70 rotates about central axis 42. In some embodiments, turntable 70 is configured to rotate a complete 360 degrees about central axis 42 relative to base 36. In other embodiments, turntable 70 is configured to rotate an angular amount less than 360 degrees about central axis 42 relative to base 36 (e.g., 270 degrees, 120 degrees, etc.).

In some embodiments, base assembly 12 can include one or more energy storage devices or power sources (e.g., capacitors, batteries, Lithium-Ion batteries, Nickel Cadmium batteries, fuel tanks, etc.), shown as batteries 64. Batteries 64 are configured to store energy in a form (e.g., in the form of chemical energy) that can be converted into electrical energy for the various electric motors and actuators of lift device 10. Batteries 64 can be stored within base 36. Lift device 10 includes a controller 38 that is configured to operate any of the motors, actuators, etc., of lift device 10. Controller 38 can be configured to receive sensory input information from various sensors of lift device 10, user inputs from user interface 20 (or any other user input device such as a key-start or a push-button start), etc. Controller 38 can be configured to generate control signals for the various motors, actuators, etc., of lift device 10 to operate any of motors, actuators, electrically powered movers, etc., of lift device 10. Batteries 64 are configured to power any of the motors, sensors, actuators, electric linear actuators, electrical devices, electrical movers, stepper motors, etc., of lift device 10. Base assembly 12 can include a power circuit including any necessary transformers, resistors, transistors, thermistors, capacitors, etc., to provide appropriate power (e.g., electrical energy with appropriate current and/or appropriate voltage) to any of the motors, electric actuators, sensors, electrical devices, etc., of lift device 10.

Batteries 64 are configured to deliver power to motors 52 to drive tractive elements 82. A rear set of tractive elements 82 can be configured to pivot to steer lift device 10. In other embodiments, a front set of tractive elements 82 are configured to pivot to steer lift device 10. In still other embodiments, both the front and the rear set of tractive elements 82 are configured to pivot (e.g., independently) to steer lift device 10. In some examples, base assembly 12 includes a steering system 150. Steering system 150 is configured to drive tractive elements 82 to pivot for a turn of lift device 10. Steering system 150 can be configured to pivot tractive elements 82 in pairs (e.g., to pivot a front pair of tractive elements 82), or can be configured to pivot tractive elements 82 independently (e.g., four-wheel steering for tight-turns).

In some embodiments, base assembly 12 also includes a user interface 21 (e.g., a HMI, a user input device, a display screen, etc.). In some embodiments, user interface 21 is coupled to base 36. In other embodiments, user interface 21 is positioned on turntable 70. User interface 21 can be positioned on any side or surface of base assembly 12 (e.g., on the front 62 of base 36, on the rear 60 of base 36, etc.)

Figure 2A:
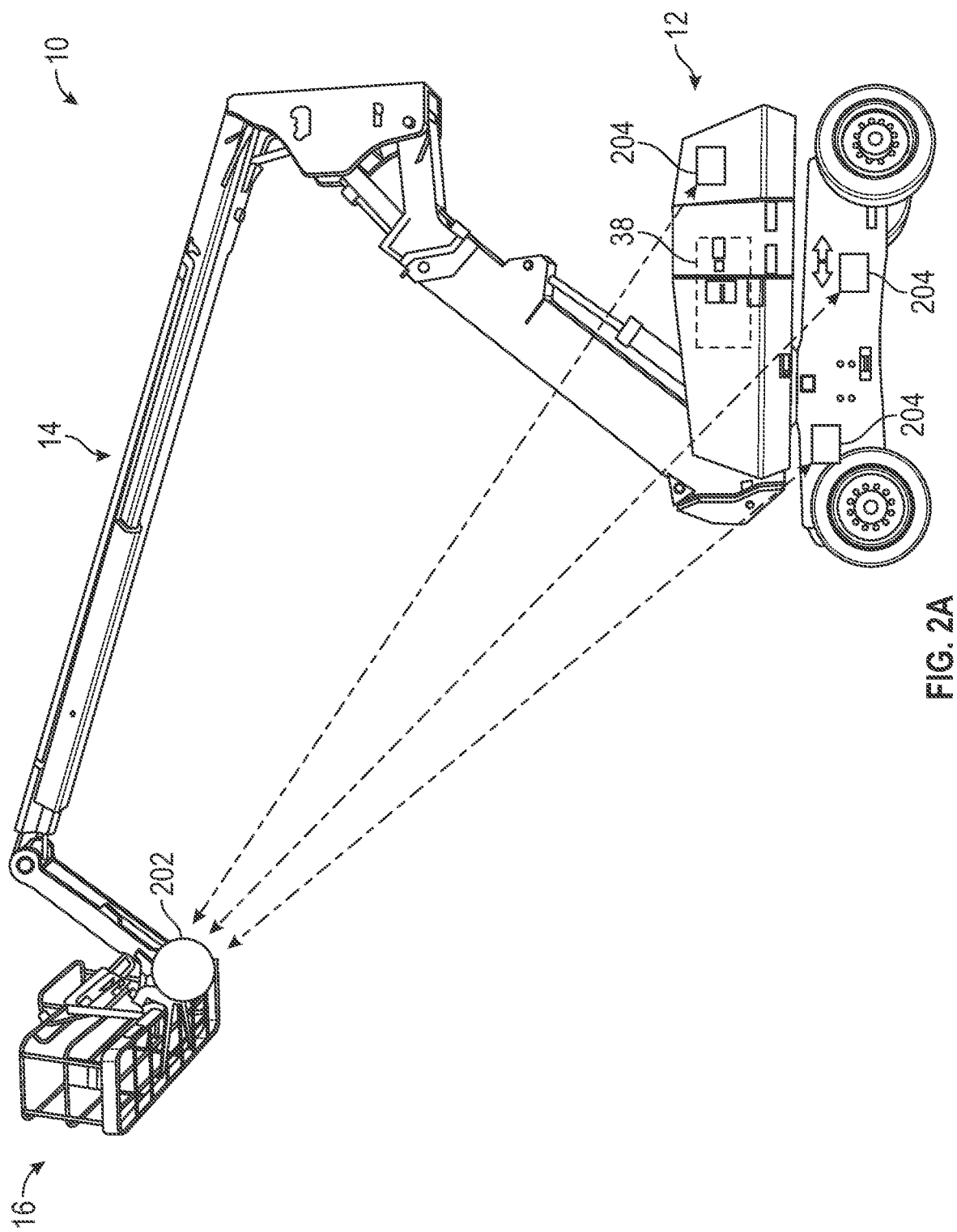
FIGS. 2A and 2B are side perspective views of the lift device of FIG. 1, according to some embodiments.
Figure 2B:
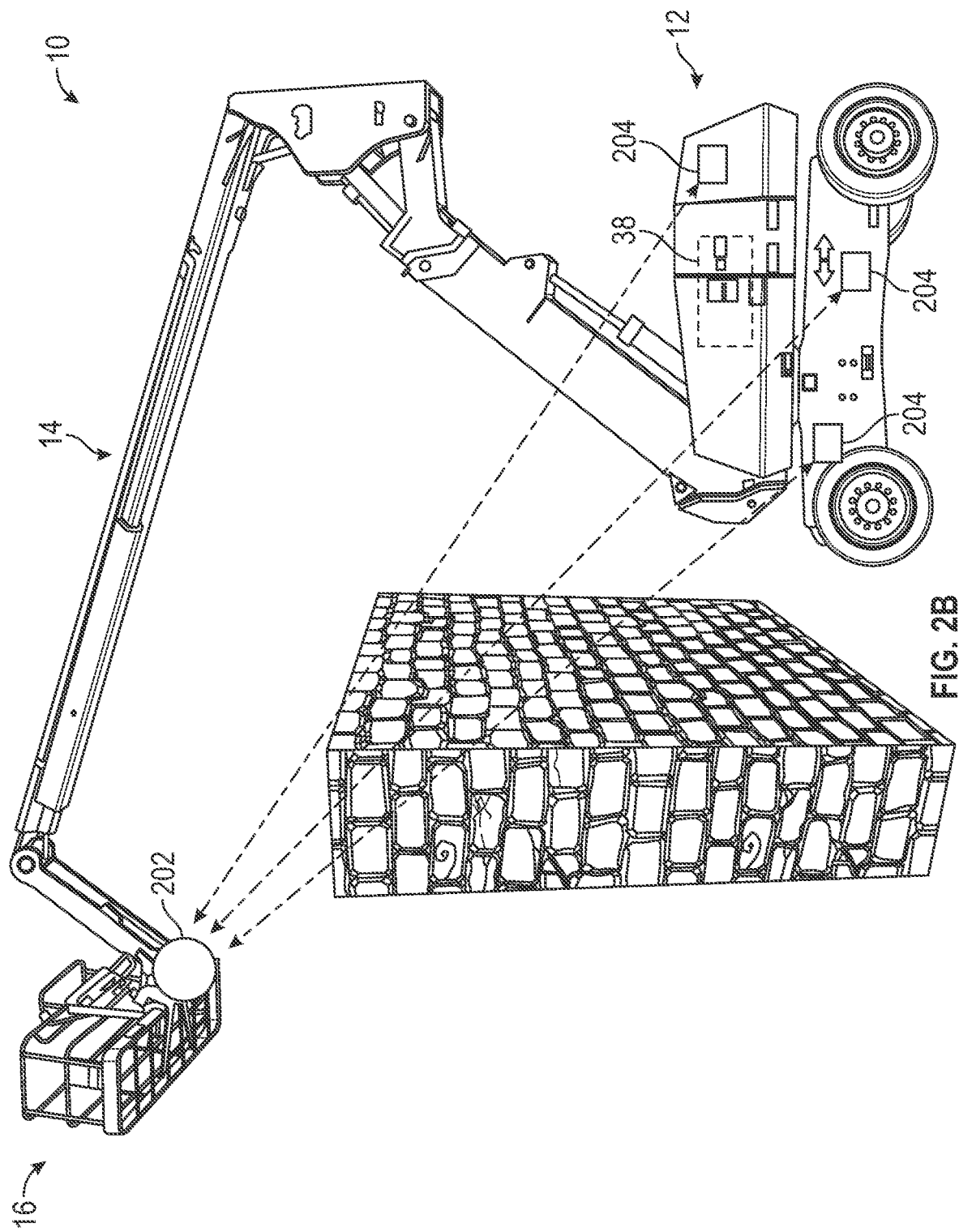

Referring now to FIGS. 2A and 2B, side perspective views of lift device 10 are shown, according to some embodiments. As shown, lift device 10 is configured to support a platform (e.g., implement 16), although it will be appreciated that the examples shown are not intended to be limiting. For example, in other configurations, implement 16 may be a fork assembly or other type of implement that may be supported by lift device 10, as discussed above.

In some embodiments, lift device 10 includes at least one first transceiver device (e.g., transceiver device 100) coupled to implement 16 (e.g., fixedly or removably). The at least one first transceiver device may be generally referred to herein as tag 202. Tag 202 may be configured to transmit and receive wireless signals and, in some embodiments, can include a memory and/or a processor for analyzing received wireless signals. In particular, tag 202 may be configured to transmit and receive short-range wireless signals, such as signals in the ultra-wideband (UWB) spectrum, which is generally between 3.1 and 10.6 GHz. Accordingly, tag 202 may also be generally referred to as an "UWB transceiver." In some embodiments, lift device 10 includes a plurality of tags 202. For example, a first tag 202 may be coupled to implement 16, as shown, while one or more additional tags 202 (e.g., multiple tags 202) may be positioned at various points along lift assembly 14. In such embodiments, a tag (e.g., tag 202) may be positioned on each arm of lift assembly 14 (e.g., lower lift arm 32a, middle lift arm 32b, upper lift arm 32c, and/or intermediate lift arm 32d). In some embodiments, tags (e.g., multiple tags 202) may be positioned on one or more outriggers or leveling devices of lift device 10 to facilitate determining a position of each outrigger for leveling lift device 10 on a surface. Accordingly, it will be appreciated that any number of tags 202 may be utilized.

In some embodiments, lift device 10 also includes one or more additional or second transceiver devices (e.g., transceiver devices 100) positioned (e.g., fixedly or removably coupled) at various points on base assembly 12. These additional or second transceiver devices may be generally referred to herein as anchors 204. Like tags 202, anchors 204 may be configured to transmit and receive wireless signals, and in some embodiments can include a memory and/or a processor for analyzing received wireless signals. Accordingly, anchors 204 may also be configured to transmit and receive short-range wireless signals in the UWB spectrum (e.g., 3.1 to 10.6 GHz) and may, therefore, be referred to as UWB transceivers. As shown in FIGS. 2A and 2B, and in some embodiments, lift device 10 includes at least three anchors 204 positioned at different points on base assembly 12. In some embodiments, lift device 10 includes a different number of anchors 204 (e.g., one, two, four, five, six, eight, ten, twelve, etc.).

As shown in FIGS. 2A and 2B, tag 202 may communicate with anchors 204 via short-range wireless signals. In particular, tag 202 may be configured to broadcast (i.e., transmit) a first wireless signal, which is subsequently detected by one or more of anchors 204. In response to receiving the first wireless signal, each of anchors 204 may broadcast (i.e., transmit) a second wireless signal. These second wireless signals may, in turn, be detected by tag 202 and utilized to determine a position of implement 16 with respect to base assembly 12. In some other embodiments, however, one or more of anchors 204 may broadcast the first wireless signal. Accordingly, in some such embodiments, the second wireless signal may be transmitted by tag 202 and detected by anchors 204. In any case, a time delay (i.e., loopback time) between when tag 202 broadcasts the first wireless signal and when tag 202 receives the second wireless signals (or a time delay between when anchors 204 broadcast the first wireless signal and when anchors 204 receive the second wireless signals) may be utilized to determine a distance between tag(s) 202 and each of anchors 204. Thus, if the position of each of anchors 204 is known, the position of implement 16 with respect to base assembly 12 can be determined. Additionally, based on the determined positioned of implement 16, the position of lift assembly 14 may also be determined (or the position of lift assembly 14 may be independently determined using tags 202 thereon).

Advantageously, determining a position of lift assembly 14 and/or implement 16 utilizing wireless signals communicated between tag(s) 202 and anchor(s) 204 can require far fewer sensors that other position detection methods. For example, some lift devices may include a plurality of angle sensors, limit switches, and other sensors for determining the angle and/or position of each arm of lift assembly 14. Therefore, the number of additional sensors can be greatly reduced for a lift device (e.g., lift device 10) utilizing tag(s) 202 and anchor(s) 204, which can reduce costs and maintenance (e.g., due to faulty sensors). Additionally, communicating in the UWB spectrum (e.g., 3.1 to 10.6 GHz) can provide a number of advantages over other position detection systems. For example, as shown in FIG. 2B, UWB signals may propagate through various materials, such as concrete, brick, wood, etc. Accordingly, the position of implement 16 can be tracked through and around obstacles that may impede other types of wireless signals. Additionally features and advantages to position tracking via tag(s) 202 and anchor(s) 204 are described in greater detail below.

Lift Assembly Position Tracking

Figure 3:
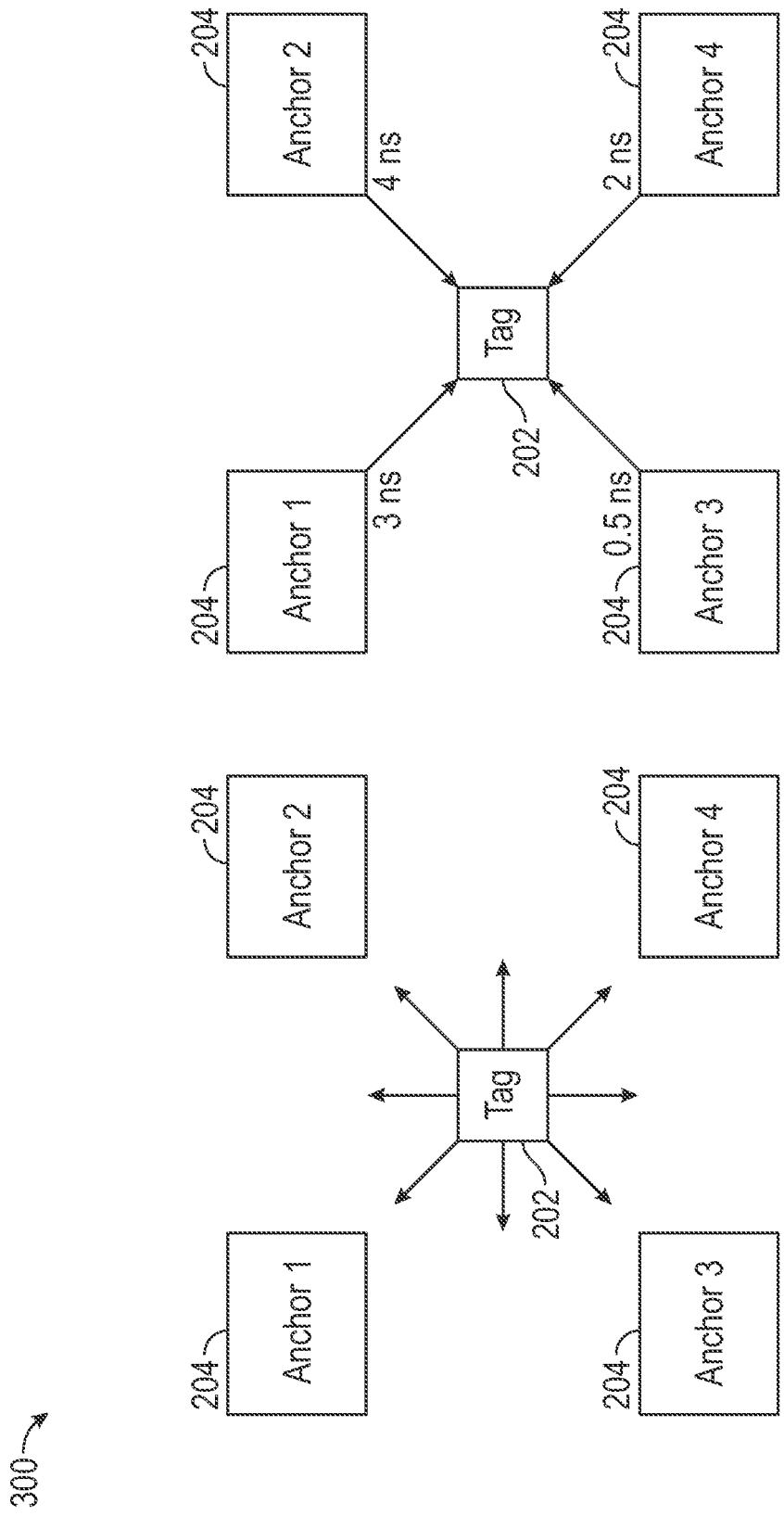
FIG. 3 is a block diagram of a system for detecting a position of an implement of the lift device of FIG. 1, according to some embodiments.

Referring now to FIG. 3, a block diagram of a system 300 (e.g., an implement/lift arm tracking system) for detecting a position of an implement (e.g., implement 16) supported by lift device 10 is shown, according to some embodiments. As described briefly above, system 300 may include one or more tags 202 and one or more anchors 204 configured to communicate via short-range wireless signals. In some embodiments, tags 202 and anchors 204 communicate in the UWB spectrum, between 3.1 and 10.6 GHz. However, it will be appreciated that, in some other embodiments, tags 202 and anchors 204 may be configured to communicate in other frequency ranges. For example, tags 202 and anchors 204 may be radio-frequency identification (RFID) tags (e.g., either passive or active), and thus may operate in any corresponding frequency bands (e.g., ultra-high frequency (UHF) RDIF operates around 433 MHZ). In any case, system 300 may be configured to determine a position of tags 202, and thereby any component of lift device 10 that tags 202 are coupled to (e.g., implement 16).

It will be also that, as described herein, system 300 may be implemented on various other types of equipment in addition to a lift device such as lift device 10. In particular, system 300 may be implemented on any equipment or device where the position of a component is tracked or determined. In some such embodiments, system 300 can be implemented on a concrete mixing vehicle, a ladder fire truck or apparatus, a crane (e.g., wrecker, IMT, etc.), a scissor lift, a front or side-loading refuse vehicle, a plow truck, a telehandler, a bucket truck, and/or a construction machine (e.g., a skid-loader, an excavator, a backhoe, a bulldozer, a feller buncher, etc.), among other suitable machines or vehicles. For example, tag 202 may be coupled to a far end of a ladder on a fire truck while anchors 204 are coupled to various points on a body of the fire truck to track a position of the ladder during operation. In another example, tag 202 may be coupled to a lift device (e.g., a fork assembly) of a refuse collection vehicle and anchors 204 may be coupled to various points on a body of the refuse vehicle to track a position of the lift device while engaging and lifting a refuse container. In this manner, system 300 may advantageously improve position tracking for a number of different types of equipment contemplated herein, and thus the examples provided (e.g., relating to lift device 10) are not intended to be limiting.

In the example shown in FIG. 3, system 300 includes four of anchors 204 and one tag 202. However, it should be understood that system 300 may include any suitable number of tags 202 and anchors 204. As described briefly above, tag 202 may be configured to broadcast (i.e., transmit) a first wireless signal, generally between 3.1 and 10.6 GHz. Each anchor 204 may detect (i.e., receive) the first wireless signal and may, in turn, broadcast (i.e., transmit) a second wireless signal (or vice versa). In some embodiments, the first and/or second wireless signals can include a variety of metadata associated with the broadcasting device. For example, the first wireless signal broadcast by tag 202 may include metadata associated with tag 202, such as an identifier (e.g., a string) for tag 202 and/or a time stamp that the first wireless signal was broadcast. Likewise, the second wireless signals broadcast by anchors 204 may include identifiers for each of anchors 204 and/or time stamps that the respective second wireless signals were broadcast.

In some embodiments, tag 202 detects (i.e., receives) the second wireless signals from anchors 204 and determines a time delay, either between the transmission of the first wireless signal and the receipt (e.g., by tag 202) of the second wireless signal or based on a time stamp associated with the second wireless signal. For example, tag 202 may record a time when the first wireless signal is broadcast and may compare this time to a time that a second wireless signal is received back from each of anchors 204 to determine the time delay (i.e., loopback time). In another example, tag 202 may simply calculate a time delay by determining an amount of time between a timestamp included as metadata in the second wireless signal and the time of receipt by tag 202.

In either case, the time delay may be utilized, in combination with a propagation speed of the wireless signals, to calculate a distance between tag 202 and each of anchors 204. Accordingly, the propagation speed of each of the first and second wireless signals may be fixed and/or known, such as based on the particular wavelength (e.g., within the UWB spectrum) that tag 202 and anchors 204 are configured to transmit. For example, distance may be calculated as:

$$d = t \times v$$

where d is a distance between tag 202 and one of anchors 204, t is the time delay, and v is the velocity (i.e., speed) of the wireless signal, which can be determined based on the frequency of the wireless signal.

In the example shown, there is (i) a 3 nanosecond (ns) delay between "Anchor 1" and tag 202 and (ii) a 4 ns delay between "Anchor 2" and tag 202. Thus, it can be determined that "Anchor 1" is closer to tag 202 than "Anchor 2." Based on the time delay and a known propagation speed of the wireless signals (e.g., the speed of light through air), the distance between (i) tag 202 and "Anchor 1" and (ii) tag 202 and "Anchor 2" can be determined. For example, at 3.1 GHz (e.g., the lower end of the UWB spectrum), a 3 ns delay would indicate that "Anchor 1" is approximately 0.899 meters from tag 202, while a 4 ns delay would indicate that "Anchor 2" is approximately 1.199 meters from tag 202.

As discussed briefly above, in some embodiments, a position of each of anchors 204 may be fixed and known. For example, the exactly position of each of anchors 204 on lift device 10 may be recorded when anchors 204 are coupled to lift device 10. Thus, based on the distance between tag 202 and each of anchors 204, and the known positions of anchors 204, a position of tag 202 can be determined. In particular, system 300 may include at least three of anchors 204 in order to triangulate the position of tag 202 based on the positions of anchors 204. For example, the position of each anchor 204 may be recorded as x, y, and z coordinates in a 3-dimensional (3D) space, with respect to a reference coordinate (e.g., 0, 0, 0), and thus the position of tag 202 may be expressed as a position (x, y, z) in the same 3D space.

Figure 4:
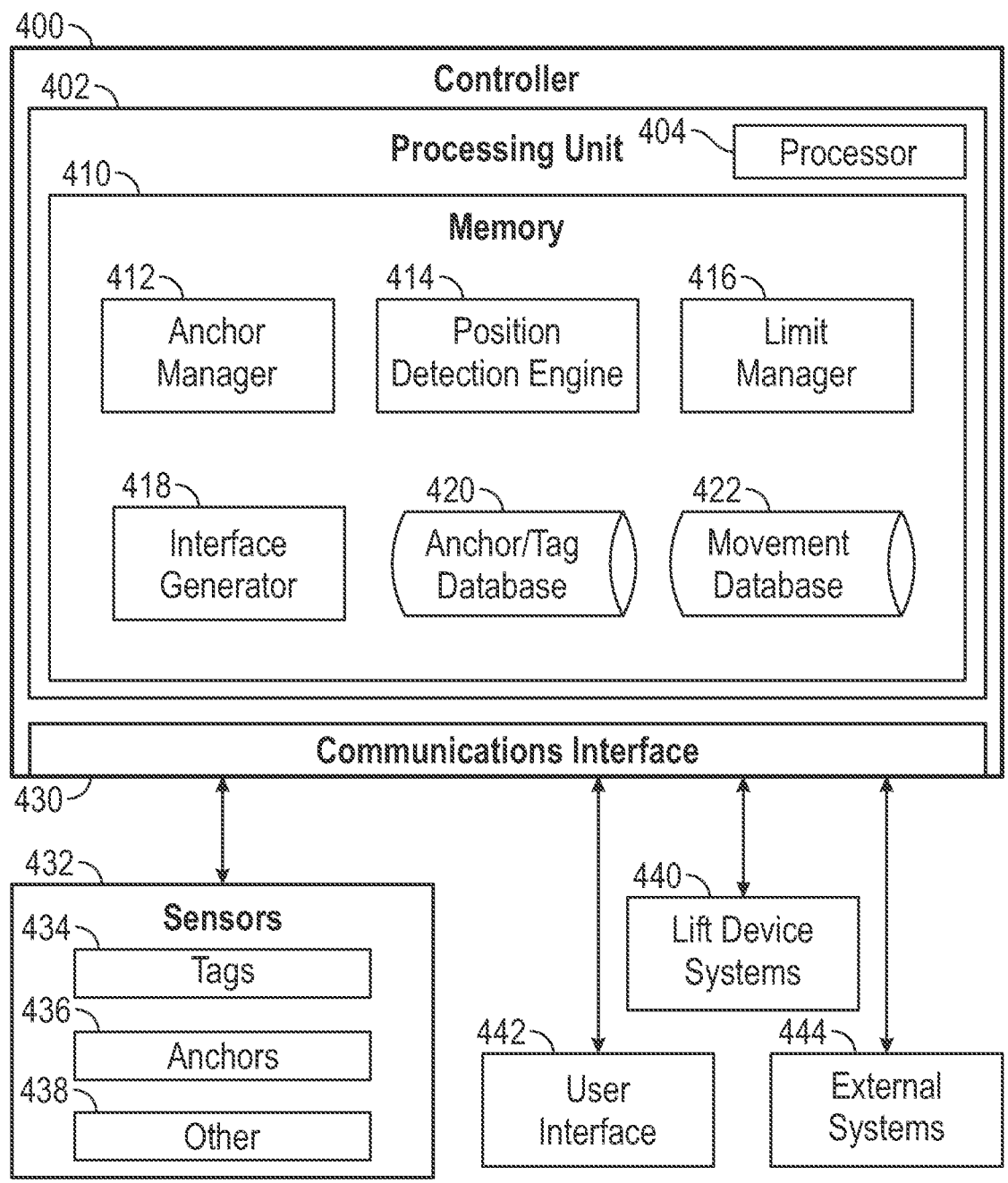
FIG. 4 is a block diagram of a controller utilized in the system of FIG. 3, according to some embodiments.

Referring now to FIG. 4, a block diagram of a controller 400 utilized in system 300 is shown, according to some embodiments. Accordingly, in some embodiments, controller 400 may be similar to or the same as controller 38, described above. In other embodiments, controller 400 is a secondary and/or separate controller from controller 38. For example, controller 38 may be configured to generate control signals for the various motors, actuators, etc., of lift device 10, while controller 400 may be configured to determine a position of an implement (e.g., implement 16) supported by lift device 10. In some other embodiments, controller 400 may be implemented within a tag 202 and/or anchor 204 of system 300, as described above. In any case, controller 400 may also be configured to determine the position of an implement (e.g., implement 16) supported by lift device 10.

Controller 400 is shown to include a processing circuit or unit 402, which includes a processor 404 and memory 410. It will be appreciated that these components can be implemented using a variety of different types and quantities of processors and memory. For example, processor 404 can be a general purpose processor, an application specific integrated circuit (ASIC), one or more field programmable gate arrays (FPGAs), a group of processing components, or other suitable electronic processing components. Processor 404 can be communicatively coupled to memory 410. While processing unit 402 is shown as including one processor 404 and one memory 410, it should be understood that, as discussed herein, a processing unit and/or memory may be implemented using multiple processors and/or memories in various embodiments. All such implementations are contemplated within the scope of the present disclosure.

Memory 410 can include one or more devices (e.g., memory units, memory devices, storage devices, etc.) for storing data and/or computer code for completing and/or facilitating the various processes described in the present disclosure. Memory 410 can include random access memory (RAM), read-only memory (ROM), hard drive storage, temporary storage, non-volatile memory, flash memory, optical memory, or any other suitable memory for storing software objects and/or computer instructions. Memory 410 can include database components, object code components, script components, or any other type of information structure for supporting the various activities and information structures described in the present disclosure. Memory 410 can be communicably connected to processor 404 via processing unit 402 and can include computer code for executing (e.g., by processor 404) one or more processes described herein.

Memory 410 is shown to include an anchor manager 412 configured to manage registration of one or more anchors, such as anchors 436 (e.g., anchors 204) described in detail below. In particular, anchor manager 412 may be configured to record, store, and/or retrieve position data and other metadata (e.g., a broadcast ID) associated with anchors 436. In some embodiments, anchor manager 412 can store position information in an anchor/tag database 420. For example, anchors 436 may be registered with controller 400 during installation on lift device 10 (e.g., when being coupled to lift device 10) by recording, via a user interface (e.g., user interface 442), a position of each anchor. In another example, each of anchors 436 may be scanned (e.g., wirelessly) via controller 400 or another device, and anchor manager 412 may record relevant metadata and position data.

In some embodiments, controller 400 can act as a reference point (e.g., coordinate 0, 0, 0 in a 3D space) with respect to anchors 436. In such embodiments, anchor manager 412 may be configured to broadcast a first wireless signal to anchors 436, causing anchors 436 to respond with a second wireless signal. Thus, the position of each of anchors 436 with respect to controller 400 may be automatically determined based on the time delay in receiving the second wireless signals. However, it will be appreciated that any other method of determining an initial position of anchors 436 may be utilized.

Memory 410 is also shown to include a position detection engine 414 configured to determine a position of an implement (e.g., implement 16) and/or a lift assembly (e.g., lift assembly 14) of lift device 10. In other words, position detection engine 414 may be configured to analyze signal data received from tags 434 (e.g., tags 202), described in greater detail below, and/or anchors 436 in order to track the position of implement 16 and/or a lift assembly 14. For example, position detection engine 414 may receive data from tags 434 and/or anchors 436 indicating time intervals at which wireless signals were received. Accordingly, position detection engine 414 may be configured to perform various calculations using this wireless signal data to determine a time delay, and therefore a distance, between tags 434 and anchors 436.

In some embodiments, position detection engine 414 is also configured to initiate position detection by causing tags 434 to transmit a signal, and/or by causing anchors 436 to transmit a signal. For example, position detection engine 414 may transmit a first signal to tags 434 and/or anchors 436, causing tags 434 and/or anchors 436 to broadcast a second wireless signal. In some embodiments, position detection engine 414 may initiate position detection at a regular interval (e.g., every few seconds, every minute, every hour, etc.). In some such embodiments, the regular interval may be predefined or may be defined by a user (e.g., via user interface 442 which may be user interface 20 and/or user interface 21).

In some embodiments, position detection engine 414 can also record a position of implement 16 and/or lift assembly 14 by storing a detected position in a movement database 422. In some such embodiments, position detection engine 414 may store a detected position along with a time stamp of when the position was detected, thereby creating a log of implement 16 and/or lift assembly 14 movements over time. As discussed in greater detail below, position logs stored in movement database 422 can subsequently be referenced to identify an amount of time spent at each position (i.e., dwell time), a path taken to reach a working position, an amount of movement at a "fixed" position (e.g., unintentional movement due to external forces acting on lift assembly 14 and/or implement 16; due system tolerances, faulty actuators, or other worn parts (i.e., system slack or slop); etc.), and other relevant data. In some embodiments, position detection engine 414 can also detect a type of implement (e.g., implement 16) coupled to lift assembly 14, such as by a broadcast ID of a tag coupled to the implement. For example, position detection engine 414 may detect the broadcast ID of a tag coupled to an implement and may compare it to known broadcast IDs (e.g., stored in a database) to identify a type (e.g., fork assembly, platform, etc.) or other information regarding the implement.

Memory 410 is also shown to include a limit manager 416 configured to limit operations of lift device 10 based on the determined position of an implement (e.g., implement 16) and/or a lift assembly (e.g., lift assembly 14). For example, limit manager 416 may be configured to transmit a control signal to lift device systems 440 (e.g., actuators of lift assembly 14, prime movers, etc.) and/or a secondary controller (e.g., controller 38) causing lift device 10 to limit or prevent movement of various components (e.g., lift assembly 14, tractive elements 82, etc.). In particular, limit manager 416 may determine that the position of implement 16 is in an undesirable position, or may determine that implement 16 is at risk of contacting an external structure (e.g., a telephone line, a wall, a tree, etc.), which may cause damage. In some embodiments, limit manager 416 may compare a position of implement 16 with a detected load weight (e.g., detected by other sensors 438, such as weight sensors) to determine whether implement 16 is outside of a permitted operating zone based on the detected weight, as described in greater detail below with respect to FIGS. 6A-6C.

In some embodiments, limit manager 416 can also detect whether implement 16 and/or lift assembly 14 is properly stowed prior to maneuvering lift device 10. For example, limit manager 416 may determine whether implement 16 is in a predefined "stow" position and, if implement 16 is not in a stow position, may limit movement speed or prevent movement of lift device 10 altogether. In some embodiments, as mentioned above, a tag (e.g., tag 202, tag 434, etc.) may be coupled to an outrigger or other stability system of lift device 10. In such embodiments, limit manager 416 can be configured to determine a position of each outrigger and can compare the position of each outrigger to a position of the other outriggers and/or body assembly 12. In this manner, limit manager 416 may not only ensure that lift device 10 is level and/or stable, but may also be configured to determine a topography of the ground underneath lift device 10 to optimize a leveling algorithm or limit use of the lift assembly 14 based on the position of the outriggers or stability system.

Memory 410 is also shown to include an interface generator 418 configured to dynamically generate, modify, and/or update graphical user interfaces that present a variety of data. For example, interface generator 418 may be configured to generate graphical user interfaces for presentation on user interface 442, user interface 20, and/or user interface 21. In some embodiments, interface generator 418 may be configured to generate a first set of interfaces for registering anchors 436 (e.g., recording a position and other metadata). In some embodiments, interface generator 418 may generate a limit interface for presentation via user interface 20, indicating that implement 16 is outside of a permitted working area, is at risk of contacting an external structure, etc. Accordingly, it will be appreciated that any sort of graphical user interface may be generated by interface generator 418.

Still referring to FIG. 4, controller 400 may be configured to communicate with various external (i.e., remote) components via a communications interface 430. Communications interface 430 can be or include wired or wireless communications interfaces (e.g., jacks, antennas, transmitters, receivers, transceivers, wire terminals, etc.) for conducting data communications with sensors 432, lift device systems 440, a user interface 442, external systems 444, and/or other external systems or devices. In some embodiments, communications via communications interface 430 may be direct (e.g., local wired or wireless communications) or via a communications network (e.g., a WAN, the Internet, a cellular network, etc.). For example, communications interface 430 can include an Ethernet card and port for sending and receiving data via an Ethernet-based communications link or network. In another example, communications interface 430 can include a Wi-Fi transceiver for communicating via a wireless communications network. In another example, communications interface 430 may include cellular or mobile phone communications transceivers. In some embodiment, communications interface 430 includes a wireless transceiver configured to operate in the UWB spectrum, in order to communicate with tags and anchors, as described in greater detail below.

As shown, controller 400 may communicate with a plurality of sensors 432 via communications interface 430. Sensors 432 may include tags 434 (e.g., similar to or the same as tag 202), anchors 436 (e.g., similar to or the same as anchors 204), and other sensors 438. Other sensors 438 may include any additional sensors that may be included on lift device 10. For example, other sensors 438 may include limit switch, angle sensors, speed sensors, motion sensors, etc. In some embodiments, other sensors 438 include load/weight sensors configured to detect a weight of a load carried by lift device 10. For example, load/weight sensors may detect the weight of implement 16 and/or any persons, equipment, or materials carried by implement 16. In some embodiments, other sensors 438 include an inertial measurement unit (IMU) configured to detect a movement speed, orientation, etc., of implement 16. In some such embodiments, the IMU and/or other sensors 438 may include, for example, accelerometers, gyroscopes, and magnetometers. Tags 434 and anchors 438 are described in greater detail below, with respect to FIGS. 5A and 5B.

Controller 400 may also communicate with lift device systems 440, as described briefly above. Lift device systems 440 may include any of the mechanical or electrical systems described above with respect to FIGS. 1A-2B. For example, lift device systems 440 may include controller 38, configured to receive sensory input information from various sensors (e.g., other sensors 438) of lift device 10, user inputs from user interface 20 or user interface 442 (or any other user input device such as a key-start or a push-button start), etc., and to generate control signals for the various motors, actuators, etc., of lift device 10 to operate any of motors, actuators, electrically powered movers, etc., of lift device 10.

User interface 442, as mentioned above, may be include any component(s) that allows a user to interact with controller 400 and/or lift device 10. In some embodiments, user interface 442 includes a screen for displaying information and/or graphics. In some such embodiments, user interface 442 may be a touchscreen capable of receiving user inputs. In some embodiments, user interface 442 includes a user input device such as a keypad, a keyboard, a mouse, a stylus, etc. Accordingly, in some embodiments, user interface 442 may be an HMI similar to, or the same as, user interface 20 and/or user interface 21 described above.

External systems 444 may include any additional systems or device, either part of lift device 10 or external to lift device 10, which may communicate with controller 400. In some embodiments, external systems 444 include a computing system (e.g., a server, a computer, etc.) located remotely from lift device 10, which can track movement data (e.g., implement 16 positions and/or lift device 10 location) for lift device 10. For example, external systems 444 may be a central computing system for an organization (e.g., a company) that owns and/or operates one or more lift devices 10, and thus external systems 444 may track movement and operation data for each of the one or more lift devices. In some embodiments, external systems 444 can include a system for controlling a plurality of autonomous vehicles (e.g., drones). Accordingly, position data of lift device 10 and/or implement 16 may be transmitted to external systems 444 and utilized to control the movement (e.g., flight) of an autonomous vehicle to a current position of lift device 10 and/or implement 16. For example, a drone may be programmed to fly to a position of implement 16 (e.g., a platform) to deliver supplies.

Figure 5A:
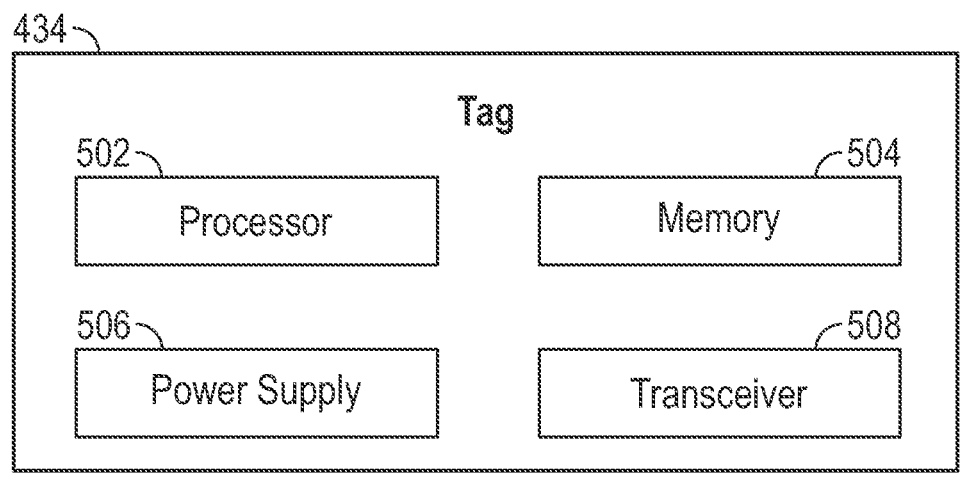
FIGS. 5A and 5B are block diagrams of tags and anchors utilized in the system of FIG. 3, according to some embodiments.
Figure 5B:
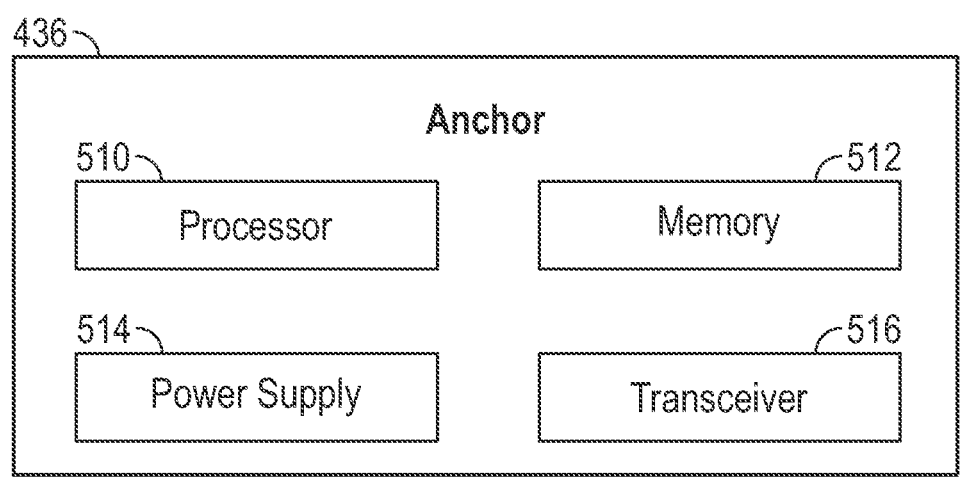

Referring now to FIGS. 5A and 5B, detailed block diagrams of tags 434 and anchors 436 are shown, according to some embodiments. As mentioned above, tags 434 and anchors 436 may be the same as, or similar to, tag 202 and anchors 204 described above, respectively. Accordingly, tags 434 and anchors 436 may each be configured to broadcast and receive wireless signals, particularly in the UWB spectrum between 3.1 GHz and 10.6 GHz. As described herein, the structure of tags 434 may also be substantially similar to, or the same as anchors 436, and vice versa. For example, tags 434 and anchors 436 may be transceiver devices including the same or similar components, and may accordingly be configured as either a tag or an anchor by reprogramming the devices.

Turning first to FIG. 5A, tag 434 is shown in greater detail. Tag 434 can include a processor 502 and a memory 504. It will be appreciated that these components can be implemented using a variety of different types and quantities of processors and memory. For example, processor 502 can be a general purpose processor, an application specific integrated circuit (ASIC), one or more field programmable gate arrays (FPGAs), a group of processing components, or other suitable electronic processing components. Processor 502 can be communicatively coupled to memory 504, such as via a processing unit (not shown). It should be understood that, as discussed herein, a processing unit and/or memory may be implemented using multiple processors and/or memories in various embodiments. All such implementations are contemplated within the scope of the present disclosure.

Memory 504 can include one or more devices (e.g., memory units, memory devices, storage devices, etc.) for storing data and/or computer code for completing and/or facilitating the various processes described in the present disclosure. Memory 504 can include random access memory (RAM), read-only memory (ROM), hard drive storage, temporary storage, non-volatile memory, flash memory, optical memory, or any other suitable memory for storing software objects and/or computer instructions. Memory 504 can include database components, object code components, script components, or any other type of information structure for supporting the various activities and information structures described in the present disclosure. In some embodiments, memory 504 can include computer code for executing (e.g., by processor 502) one or more processes described herein.

Tag 434 is also shown to include a power supply 506, configured to provide energy (e.g., electricity) to the components of tag 434. In some embodiments, power supply 506 is a battery (e.g., alkaline, zinc, lithium, nickel-cadmium, etc.). For example, power supply 506 may include a removable and/or rechargeable battery or set of batteries. In other embodiments, power supply 506 may be connected to an external power source (e.g., batteries 64, a generator, a solar panel, etc.). For example, power supply 506 may receive electricity from lift device 10 to power tag 434.

Tag 434 is also shown to include a transceiver 516 configured to broadcast (i.e., transmit) and receive wireless (e.g., radio frequency (RF)) signals. In some embodiments, tag 434 itself is a transceiver, and thus transceiver 516 may not be a separate component. However, transceiver 516 is described separately herein for clarity. Transceiver 516 may be configured to operate between 3.1 and 10.6 GHz (e.g., UWB), in some cases, but may also be configured to operate in other frequency bands. In some embodiments, tag 434 can include multiple transceivers 516, where each different transceiver 516 can operate in a different frequency band. For example, a first transceiver may operate over the entire UWB spectrum, while a second transceiver may operate in higher or lower spectrums for other types of communication (e.g., 433 MHz for RFID, 26-50 GHz for 5G cellular communications, etc.). Accordingly, tag 434 may be configured to communicate with anchors 436 via short-range, UWB signals, and may communicate with other components (e.g., controller 400) via a secondary frequency range (e.g., 4G or 5G cellular signals, Wi-Fi signals, etc.).

Turning now to FIG. 5B, anchor 436 is shown in greater detail. As discussed above, in some embodiments, anchor 436 may be the same as or similar to tag 434, and thus may include similar components to tag 434. Specifically, anchor 436 can include a processor 510 and a memory 512. It will be appreciated that these components can be implemented using a variety of different types and quantities of processors and memory. For example, processor 510 can be a general purpose processor, an application specific integrated circuit (ASIC), one or more field programmable gate arrays (FPGAs), a group of processing components, or other suitable electronic processing components. Processor 510 can be communicatively coupled to memory 512, such as via a processing unit (not shown). It should be understood that, as discussed herein, a processing unit and/or memory may be implemented using multiple processors and/or memories in various embodiments. All such implementations are contemplated within the scope of the present disclosure.

Memory 512 can include one or more devices (e.g., memory units, memory devices, storage devices, etc.) for storing data and/or computer code for completing and/or facilitating the various processes described in the present disclosure. Memory 512 can include random access memory (RAM), read-only memory (ROM), hard drive storage, temporary storage, non-volatile memory, flash memory, optical memory, or any other suitable memory for storing software objects and/or computer instructions. Memory 512 can include database components, object code components, script components, or any other type of information structure for supporting the various activities and information structures described in the present disclosure. In some embodiments, memory 512 can include computer code for executing (e.g., by processor 510) one or more processes described herein. Anchor 436 can also include a power supply 514 and a transceiver 516 similar to tag 434.

As mentioned briefly above, in some embodiments, one or both of tag 434 and anchor 436 may include the various functions and components of controller 400, as described above. For example, anchor 436 may be similar to or the same as controller 400, while any additional anchors or tags (e.g., of system 300) may have comparatively reduced functionality. In this manner, the cost and complexity of developing and implementing a separate controller device (e.g., controller 400) may be avoided. Additionally, system 300 may be simplified by configuring one of tag 434 or anchor 436 to operate as controller 400, without requiring a separate controller device.

Figure 6A:
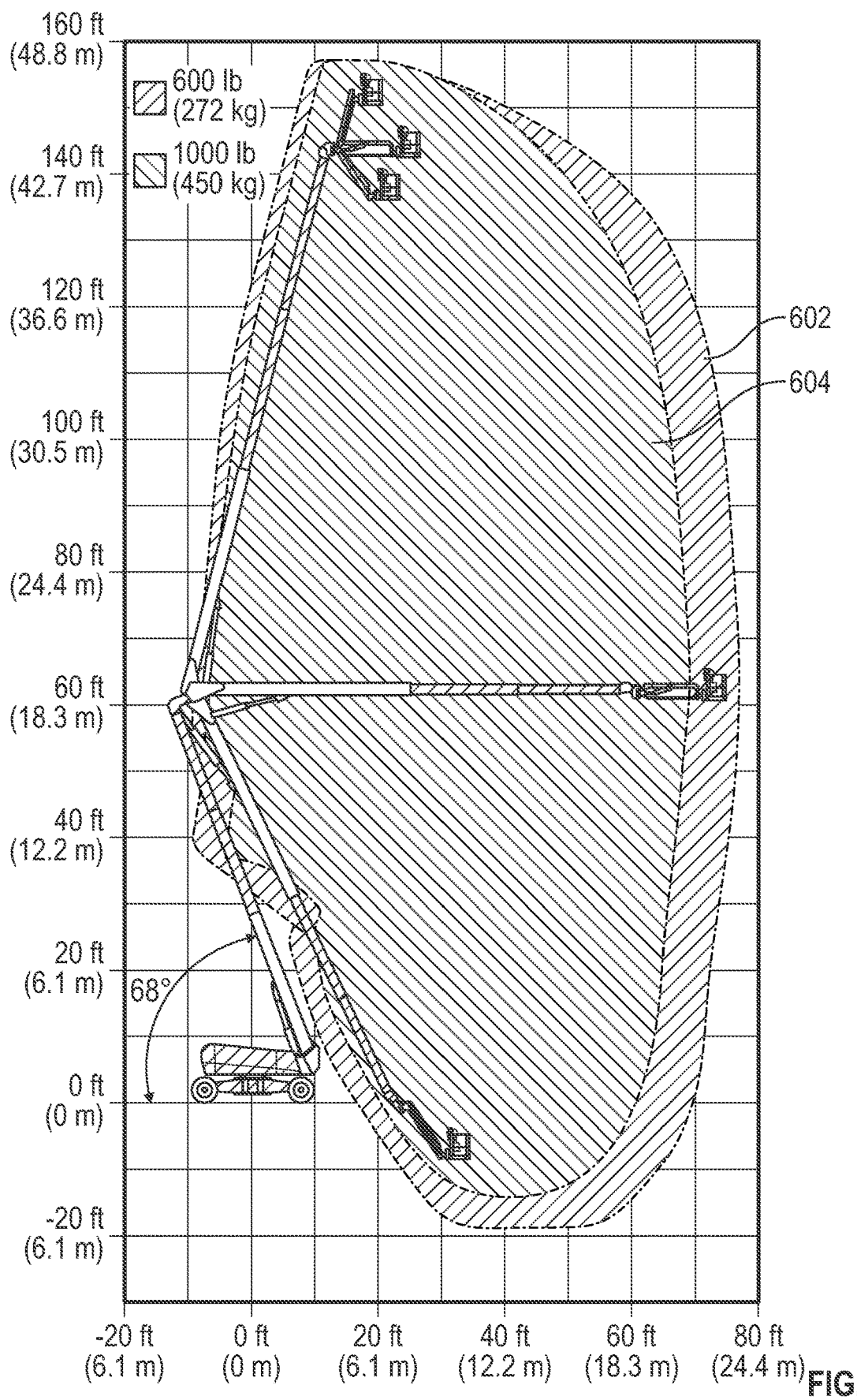
FIGS. 6A-6C are diagrams illustrating position detection for the implement of the lift device of FIG. 1, according to some embodiments.
Figure 6B:
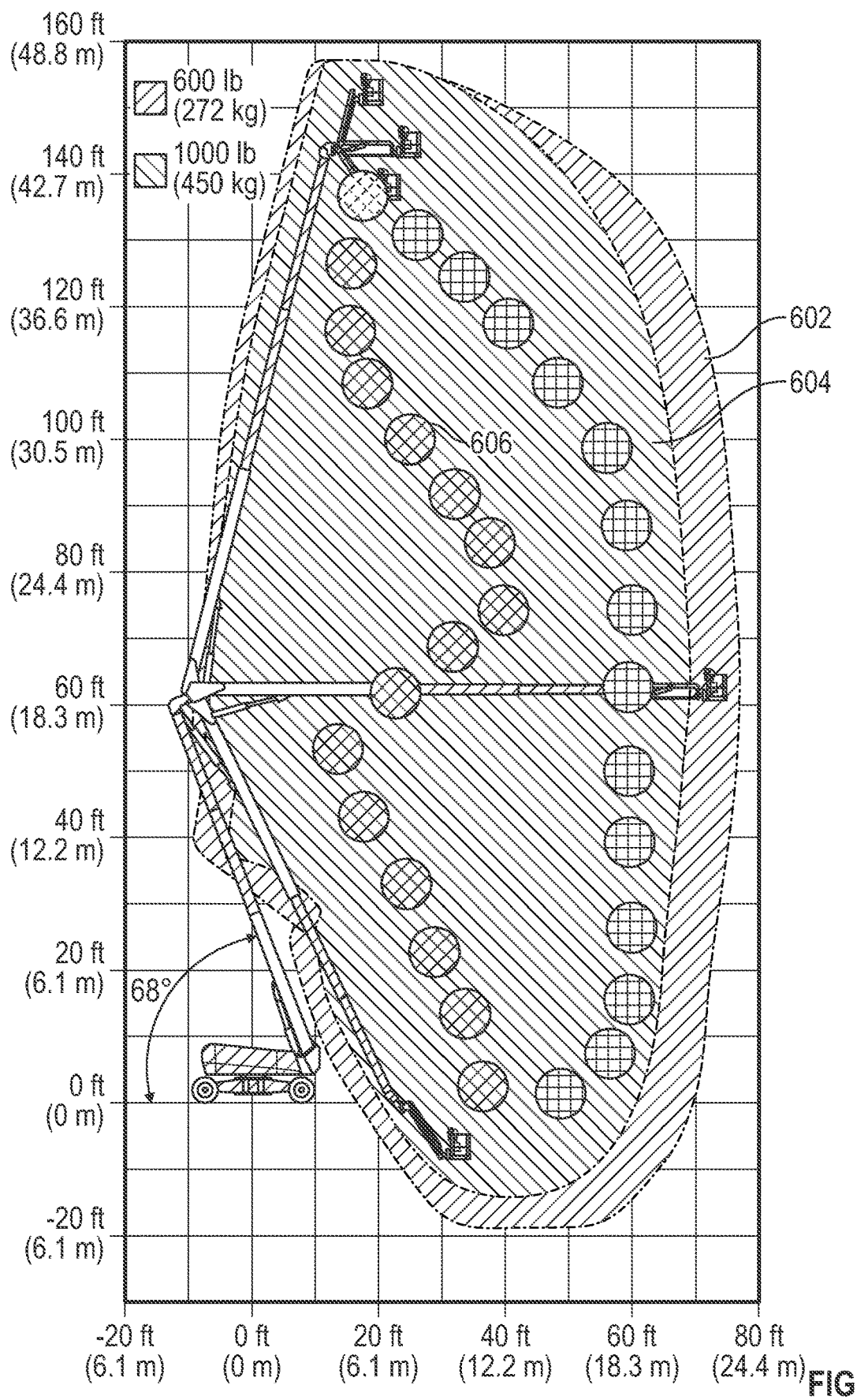
Figure 6C:
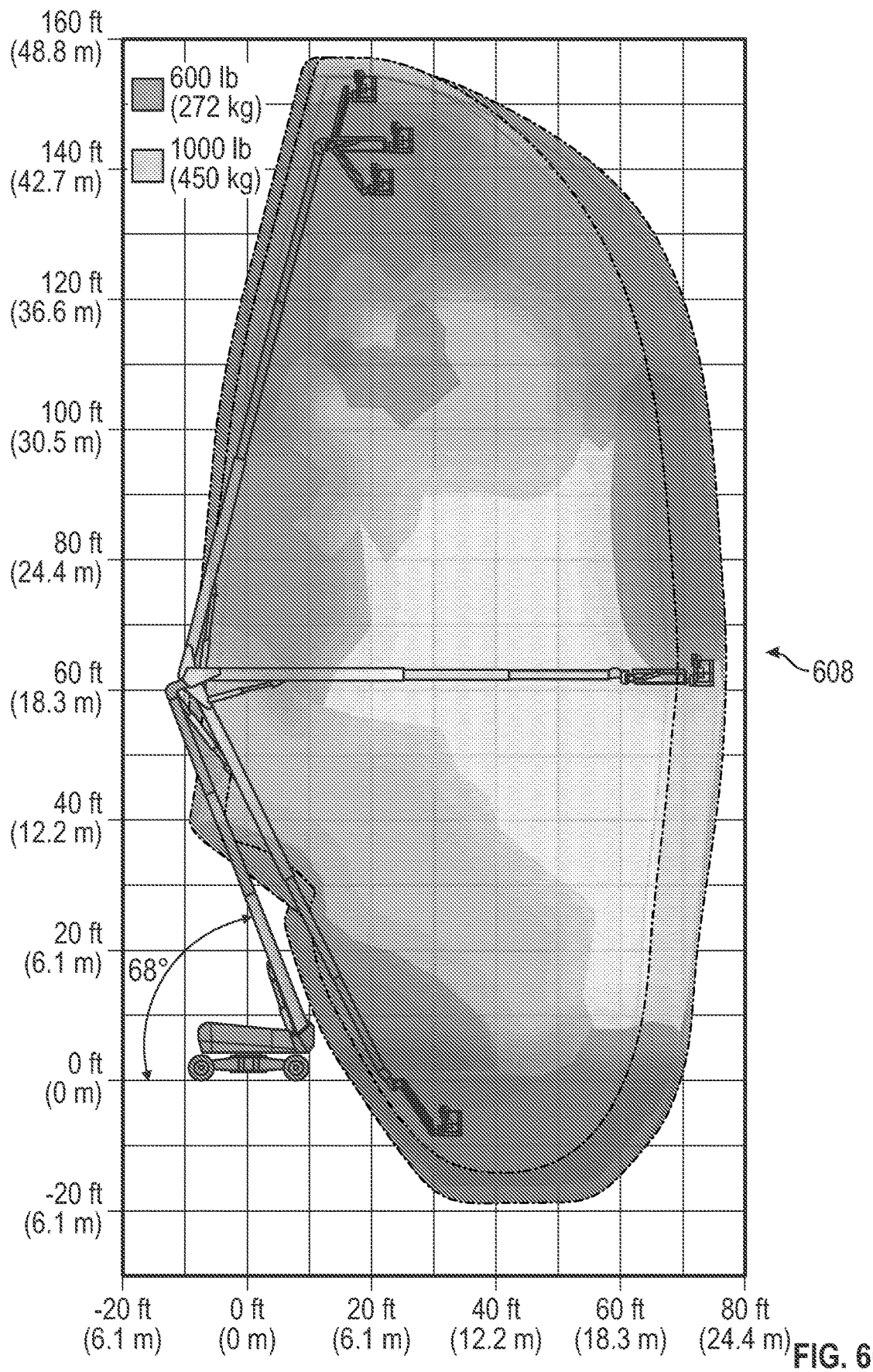

Referring now to FIGS. 6A-6C, diagrams illustrating position detection for lift device 10 are shown, according to some embodiments. In particular, each of FIGS. 6A-6C includes a diagram showing a range of positions of an implement (e.g., implement 16) and/or a lift assembly (e.g., lift assembly 14) of lift device 10. For example, FIG. 6A shows a number of positions that implement 16 can reach when lower lift arm 32a is at a 68° angle with respect to ground. FIGS. 6A-6C also illustrate a first zone 602 and a second zone 604, which represent positions that can be reached at various different loads (e.g., 600 pounds and 1000 pounds, respectively). In some embodiments, any of FIGS. 6A-6C may also represent user interfaces that can be presented via user interface 442, user interface 20, and/or user interface 21.

Turning first to FIG. 6A, first zone 602 includes a range of positions that implement 16 can reach when carrying a 600 pound (lb) load. If implement 16 is a platform, for example, this 600 lb load may include the weight of an operator and equipment. If implement 16 is another device, such as a fork assembly, this 600 lb load may include the weight of any materials (e.g., a pallet) being carried by the fork assembly. Likewise, second zone 604 includes a range of positions that implement 16 can reach when carrying a 1000 lb load. As shown, implement 16 may be permitted to reach slightly greater distances from a reference point (e.g., the base of lift device 10) when carrying a lighter load. For example, first zone 602 extends to about 75 feet from base assembly 12 of lift device 10 at its farthest point, whereas second zone 604 extends about 69 feet from base assembly 12.

Turning now to FIG. 6B, a plurality of specific positions can be represented by points 606. Points 606 may each represent a point in a 3D space, generally with respect to a reference point (e.g., base assembly 12 at point 0, 0, 0). In some embodiments, a position of implement 16 is detected at a working position (e.g., at only one point 606). Accordingly, the working position of implement 16 may be represented as x, y, and z coordinates, although other methods of representing the location or position of implement 16 may also be utilized. Additionally, a path taken to reach a working position (x, y, z) can be represented by one or more points 606. For example, each point 606 can represent a set of coordinates, and the change between coordinates (Δx, Δy, Δz) can be determined to represent the path and/or movements to reach the working position. Additionally, an amount of time spent at each position may be recorded.

In some embodiments, an "infinite" number of points 606 can be used to represent the positions of implement 16. In such embodiments, as shown in FIG. 6C, a map 608 of positions can be generated. Map 608, similar to a heat map, may utilize varying colors, patterns, or other identifiers to indicate different positions or areas occupied by implement 16. For example, a first color (e.g., red) or pattern may indicate positions that were occupied for greater amounts of time than other positions represented by a second color (e.g., green) or pattern. In this manner, map 608 may intuitively represent dwell times at any number of positions, and may also indicate an amount of movement at a fixed location.

Figure 7:
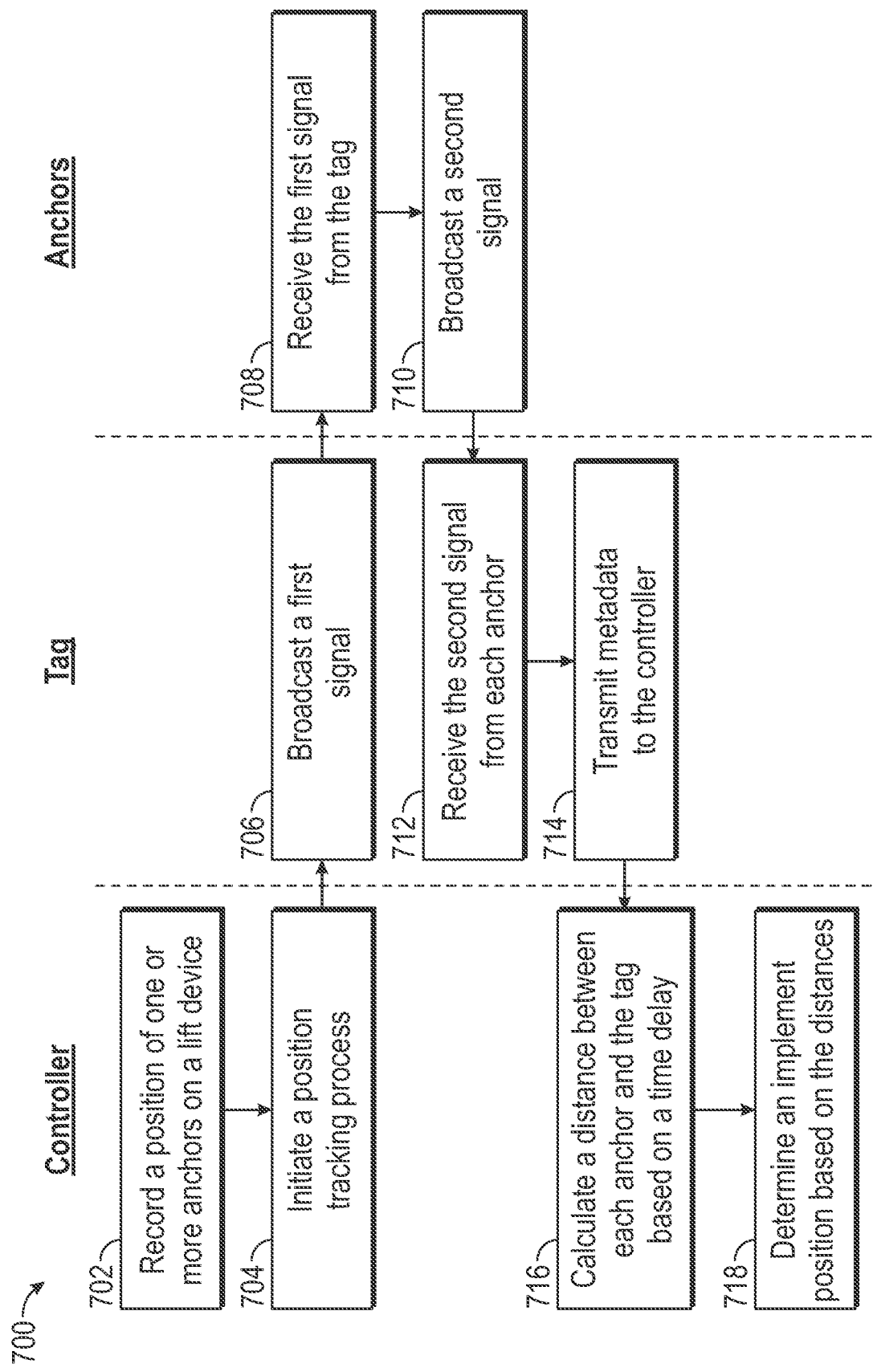
FIG. 7 is a flow diagram of a process for tracking a position of the implement of the lift device of FIG. 1, according to some embodiments.

Referring now to FIG. 7, a flow diagram of a process 700 for tracking a position of an implement (e.g., implement 16) supported by lift device 10 is shown, according to some embodiments. As shown, process 700 may be implemented by one or more of the components of system 300 and/or controller 400, as described above. For example, certain steps of process 700 may be executed by a tag and/or anchor, while other steps may be executed by controller 400. In some embodiments, such as where one of a tag or an anchor is configured to operate as controller 400 (i.e., where controller 400 is integrated into a tag or anchor), the steps shown as executed by a controller may instead be executed by a tag or an anchor. Accordingly, it will be appreciated that certain steps of process 700 may be optional and, in some embodiments, process 700 may be implemented using less than all of the steps.

At step 702, a position of one or more anchors coupled to a lift device (e.g., lift device 10) is recorded. As described above, the one or more anchors can include a first transceiver or a first set of transceivers figured as anchors (e.g., anchors 436, anchors 204, etc.). In this regard, the one or more anchors may be configured to transmit and receive wireless signals. In some embodiments, the anchor(s) are configured to operate in the UWB spectrum, between 3.1 and 10.6 GHz, as also described in detail above. The anchor(s) may be removably or fixedly coupled to one or more points of a base (e.g., base assembly 12) of the lift device. In some embodiments, at least three anchors are coupled at three distinct positions of the lift device, to improve position detection accuracy in the following steps of process 700.

In some embodiments, the position of the anchor(s) is recorded as coordinates (x, y, z) in a 3D space. In such embodiments, the initial position of the anchor(s) may be determined with respect to a central or reference point (0,0,0), which may be one or the anchors or another point on lift device 10. In other embodiments, another method of determining the anchor(s) initial position may be used. For example, the position of each anchor may be recorded as geographical coordinates based on GPS data. In some embodiments, additional metadata associated with each anchor may also be recorded. For example, an identifier (e.g., a broadcast ID) may be recorded for each anchor, and thereby associated with the anchor's position. In this manner, the anchors and their positions may be easily identified.

At step 704, a position tracking process is initiated. In some embodiments, the position tracking process is initiated by a controller (e.g., controller 400). In such embodiments, the controller may transmit a control signal or a command to a second transceiver or set of transceivers configured as a tag (e.g., tags 434), causing the tag(s) to initiate the tracking process. In other embodiments, the controller may transmit a control signal or a command to any of the anchors, causing the anchor(s) to initiate the tracking process.

In other embodiments, the position tracking process is initiated by the tag(s). As described above, the tag may be configured to transmit and receive wireless signals at a similar frequency to the anchor(s). Accordingly, in some embodiments, the tag is configured to operate in the UWB spectrum, between 3.1 and 10.6 GHz, as described in detail above. The tag may be removably or fixedly coupled to one or more points of the lift device to be tracked. In particular, the tag or tags may be coupled to an implement (e.g., implement 16) carried by the lift device, and/or may be positioned at various points along the lift assembly. It will be appreciated that any number of tags may be included and these tags may be positioned at any point of the lift device for tracking.

At step 706, the tag broadcasts a first wireless signal. As described above, the first wireless signal may be a short-range wireless signal. In some embodiments, "short-range" may refer to wireless signals broadcast in the UWB spectrum, as also described above. In some embodiments, the first wireless signal may include metadata associated with the tag, such as a broadcast ID of the tag and/or a time stamp associated with the broadcast of the first wireless signal. Subsequently, at step 708, the one or more anchors may receive (e.g., detect) the first wireless signal. However, it may be appreciated that, in some embodiments where the position tracking process is initiated by an anchor, steps 706 and 708 may be optionally executed.

At step 710, each of the one or more anchors broadcasts a second wireless signal, in response to receiving and/or analyzing the first wireless signal. Like the first wireless signal broadcast by the tag, the second wireless signals may be a short-range wireless signals (e.g., in the UWB spectrum). In some embodiments, each of the second wireless signals may include metadata associated with a respective anchor, such as a broadcast ID of the anchor and/or a time stamp associated with the broadcast of the second wireless signal. Subsequently, at step 712, the tag receives (e.g., detects) the second wireless signal.

At step 714, the tag transmits wireless signal metadata to a controller (e.g., controller 400). As described above, the wireless signal metadata may include at least a broadcast ID associated with each anchor and a time stamp that a wireless signal was received from each of the anchors. In some embodiments, the wireless metadata may also include a time delay between when the first wireless signal was broadcast (e.g., by the tag) and when a second wireless signal was received (e.g., by the tag) from each anchor. In other embodiments, the time delay may be calculated by the controller at step 716, described below.

At step 716, a distance between each anchor (e.g., each of the second transceivers) and the tag (e.g., the first transceiver) is calculated based on a time delay associated with the first and/or second wireless signals. As mentioned above, a time delay can indicate an amount of time between when the first wireless signal was broadcast by the tag and when a second wireless signal was received by the tag from each anchor. Accordingly, a time delay may be calculated for each anchor. As described above with respect to FIG. 3, the time delays may be utilized in combination with a propagation speed of the wireless signals (e.g., the speed of light), to calculate a distance between the tag and each anchor. For example, a distance may be calculated as a product of the velocity of the wireless signal and the time delay.

At step 718, a position of the implement (e.g., implement 16) is determined based on the calculated distances between the tag and the anchors. In some embodiments, the position of the implement may be triangulated based on the distance between the tag and at least three anchors, as described in greater detail above. In some embodiments, process 700 may be continuously or regularly executed to continuously update a position of the implement. For example, after the position of the implement is determined, process 700 may immediately, or after a predetermine time interval, proceed back to step 704 to reinitiate the position tracking process.

In some embodiments, additional data may also be utilized to determine a speed, position, angle, etc. of the implement. For example, an IMU may be coupled to the implement, as described above, and velocity or other movement data from the IMU may be analyzed along with the calculated distances (e.g., from step 716) to provide a more accurate determination of the implement's position. Advantageously, determining an implement's position based by triangulation of UWB signals and/or other motion data may provide a more accurate measurement than other methods that utilize sensors such as limit switches, angle sensors, etc. Additionally, as described above, UWB signals may propagate through solid objects such as walls, providing an advantage over other RF signals operating outside of the UWB spectrum.

In some embodiments, the determined position of the implement can be utilized to perform one or more automated actions, such as initiating operation limiting processes. For example, it may be determined that the implement is outside of a permitted position based on a load carried by the implement. Accordingly, once the implement's position is determined, a controller may initiate limiting measures such as limiting movement of lift device 10, lift assembly 14, and/or implement 16. In some embodiments, the limiting measures may also include presenting, via a user interface, an alert or notification that the implement is outside of a recommended operating zone or range. Thus, an operator can control lift device 10 to bring the implement back into the recommended range.

In some embodiments, position data for the implement may be recorded over time, to determine dwell times at various positions, the most frequent positions, etc. Accordingly, in some embodiments, recorded position data may enable autonomous or semi-autonomous operations of lift device 10. For example, an implement may be automatically maneuvered to a working position and/or a previous position by continuously detecting the implement's position in space. In some embodiments, position data may also be useful in determining a quickest route (e.g., a set of maneuvers) to a desired position (e.g., a working position). Thus, the implement may be automatically maneuvered to the desired position much more quickly than by manual control.

In some embodiments, position data may also be shared (e.g., transmitted) with other external and/or remote systems and devices. For example, position data can be shared with a remote computing system to track lift device 10 usage and/or to ensure that certain measures are being followed. In some embodiments, position data may be shared with a drone delivery system, allowing a drone to determine a location of an implement (e.g., a platform) and subsequently fly to the implement, such as to delivery supplies, tools, etc. In some embodiments, position data is shared with other autonomous devices and/or systems for controlling autonomous devices (e.g., drones, autonomous lift devices, etc.). For example, position data may be shared with an autonomous scissor lift, such that the scissor lift can track and follow lift device 10 (e.g., to act as a "smart" trailer for carrying material). Additionally, position data may be useful in determining the most ideal and/or secure positions for an implement, such as based on a load weight.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the lift device 10 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:
1. A machine system comprising:
a first wireless transceiver configured to couple to a portion or a component of a lift assembly of a machine, the first wireless transceiver configured to transmit a first wireless signal;
a plurality of second wireless transceivers configured to couple to a base of the machine, the plurality of second wireless transceivers configured to detect the first wireless signal and transmit a plurality of second wireless signals in response to detecting the first wireless signal, wherein the first wireless transceiver is configured to detect the plurality of second wireless signals; and a processing circuit communicably coupled to the first wireless transceiver, the processing circuit configured to determine a position of the portion or the component of the lift assembly based on a time delay determined based on an amount of time between (i) a first time when the first wireless signal is transmitted by the first wireless transceiver and a second time at which each of the plurality of second wireless signals is detected by the first wireless transceiver or (ii) a timestamp included with each of the plurality of second wireless signals and a receipt time that each of the plurality of second wireless signals is detected by the first wireless transceiver.

2. The machine system of claim 1, wherein the first wireless transceiver and the plurality of second wireless transceivers are ultra-wideband transceivers configured to transmit the first wireless signal and the plurality of second wireless signals, respectively, between 3.1 GHz and 10.6 GHz.

3. The machine system of claim 1, wherein the first wireless transceiver is configured to couple to the component of the lift assembly, and wherein the processing circuit is configured to detect a type of the component based on information acquired from the first wireless transceiver.

4. The machine system of claim 3, wherein the component includes at least one of a platform, a fork assembly, a bucket, a basket, a grabber mechanism, a plow, or a water deluge turret.

5. The machine system of claim 1, wherein the processing circuit and the first wireless transceiver are integrated into a single device.

6. The machine system of claim 1, further comprising the lift assembly, wherein the lift assembly is configured for a lift device, a boom lift, a telehandler, a refuse vehicle, a fire apparatus, a bucket truck, a crane, a concrete mixer truck, or a construction machine.

7. The machine system of claim 1, wherein the processing circuit is configured to determine the position of the portion or the component of the lift assembly based on the time delay determined based on the amount of time between the first time when the first wireless signal is transmitted by the first wireless transceiver and the second time at which each of the plurality of second wireless signals is detected by the first wireless transceiver.

8. The machine system of claim 1, wherein the processing circuit is configured to determine the position of the portion or the component of the lift assembly based on the time delay determined based on the amount of time between the timestamp included with each of the plurality of second wireless signals and the receipt time that each of the plurality of second wireless signals is detected by the first wireless transceiver.

9. A machine system comprising:
a first wireless transceiver configured to couple to a portion or a component of a lift assembly of a machine, the first wireless transceiver configured to transmit a first wireless signal;
a plurality of second wireless transceivers configured to couple to a base of the machine, the plurality of second wireless transceivers configured to detect the first wireless signal and transmit a plurality of second wireless signals in response to detecting the first wireless signal, wherein the first wireless transceiver is configured to detect the plurality of second wireless signals; and a processing circuit communicably coupled to the first wireless transceiver, the processing circuit configured to:
determine a position of the portion or the component of the lift assembly based on information acquired from the first wireless transceiver;
store a log of the position over time; and
generate a heat map identifying various positions of the portion or the component and varying degrees of time spent at each of the various positions based on the log.

10. The machine system of claim 9, wherein the machine is a lift device, a boom lift, a telehandler, a refuse vehicle, a fire apparatus, a bucket truck, a crane, a concrete mixer truck, or a construction machine.

11. The machine system of claim 9, further comprising the lift assembly, wherein the first wireless transceiver is coupled to an aerial ladder of the lift assembly.

12. The machine system of claim 9, further comprising the lift assembly, wherein the first wireless transceiver is coupled to a boom arm of the lift assembly.

13. The machine system of claim 9, further comprising the lift assembly, wherein the first wireless transceiver is coupled to the component of the lift assembly, and wherein the component is a platform, a fork assembly, a bucket, a basket, a grabber mechanism, a plow, or a water deluge turret.

14. The machine system of claim 9, wherein the first wireless transceiver is a plurality of first wireless transceivers, and wherein a first one of the plurality of first wireless transceivers is coupled to an implement of the lift assembly and a second one of the plurality of first wireless transceivers is coupled to an arm or a ladder of the lift assembly.

15. The machine system of claim 9, wherein processing circuit is configured to generate the heat map using at least one of different colors or different patterns to indicate the varying degrees of time spent at each of the various positions.

16. The machine system of claim 9, wherein the processing circuit is configured to provide the heat map for display on a display device.

17. The machine system of claim 9, wherein the processing circuit and the first wireless transceiver are integrated into a single device.

18. A machine system comprising:
a first wireless transceiver configured to couple to a portion or a component of a lift assembly of a machine, the first wireless transceiver configured to transmit a first wireless signal;
a plurality of second wireless transceivers configured to couple to a base of the machine, the plurality of second wireless transceivers configured to detect the first wireless signal and transmit a plurality of second wireless signals in response to detecting the first wireless signal, wherein the first wireless transceiver is configured to detect the plurality of second wireless signals; and
a processing circuit configured to:
determine a position of the portion or the component of the lift assembly based on information acquired from the first wireless transceiver; and
identify unintentional movement of the portion or the component of the lift assembly while the lift assembly is at a set position.

19. The machine system of claim 18, further comprising the lift assembly, wherein the lift assembly is configured for use with a lift device, a boom lift, a telehandler, a refuse vehicle, a fire apparatus, a bucket truck, a crane, a concrete mixer truck, or a construction machine.

20. The machine system of claim 18, wherein the processing circuit and the first wireless transceiver are integrated into a single device.

* * * * *